US011512257B1

(12) United States Patent
Spicer et al.

(10) Patent No.: US 11,512,257 B1
(45) Date of Patent: *Nov. 29, 2022

(54) INTEGRATION OF HYDROGEN-RICH FUEL-GAS PRODUCTION WITH OLEFINS PRODUCTION PLANT

(71) Applicant: ExxonMobil Chemical Patents Inc., Baytown, TX (US)

(72) Inventors: David Spicer, Houston, TX (US); Thomas T. Hirst, Houston, TX (US); James L. Kendall, Humble, TX (US); You Fang, Singapore (SG); Steven M. Slack, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,042

(22) Filed: Sep. 24, 2021

(51) Int. Cl.
*C10G 9/36* (2006.01)
*C01B 3/34* (2006.01)
*C01B 3/52* (2006.01)

(52) U.S. Cl.
CPC ............... *C10G 9/36* (2013.01); *C01B 3/34* (2013.01); *C01B 3/52* (2013.01); *C01B 2203/0216* (2013.01); *C01B 2203/0415* (2013.01); *C01B 2203/062* (2013.01); *C01B 2203/0833* (2013.01); *C01B 2203/1241* (2013.01); *C01B 2203/84* (2013.01); *C10G 2300/4043* (2013.01); *C10G 2300/42* (2013.01); *C10G 2300/807* (2013.01); *C10G 2400/20* (2013.01)

(58) Field of Classification Search
CPC ..... C01B 3/34; C01B 3/52; C01B 2203/0216; C01B 2203/0415; C01B 2203/062; C01B 2203/0833; C01B 2203/1241; C01B 2203/84; C10G 9/36; C10G 2300/4043; C10G 2300/42; C10G 2300/807; C10G 2400/20
See application file for complete search history.

(56) References Cited

U.S. PATENT DOCUMENTS

| | | |
|---|---|---|
| 4,869,894 A | 9/1989 | Wang et al. |
| 8,021,464 B2 | 9/2011 | Gauthier et al. |
| 8,460,630 B2 | 6/2013 | Niitsuma et al. |
| 9,216,903 B2 | 12/2015 | McKenna et al. |
| 9,580,314 B2 | 2/2017 | Darde et al. |

(Continued)

FOREIGN PATENT DOCUMENTS

WO 2020/131981 6/2020

OTHER PUBLICATIONS

U.S. Appl. No. 17/483,939, filed Sep. 24, 2021, Entitled "Production of Hydrogen-Rich Fuel-Gas with Reduced CO2 Emission" Spicer et al.

(Continued)

*Primary Examiner* — Jafar F Parsa
(74) *Attorney, Agent, or Firm* — Siwen Chen

(57) ABSTRACT

An $H_2$-rich fuel gas production plant comprising a syngas production unit can be advantageously integrated with an olefins production plant comprising a steam cracker in at least one of the following: (i) fuel gas supply and consumption; (ii) feed supply and consumption; and (iii) steam supply and consumption, to achieve considerable savings in capital and operational costs, enhanced energy efficiency, and reduced $CO_2$ emissions, compared to operating the plants separately.

25 Claims, 7 Drawing Sheets

(56) References Cited

U.S. PATENT DOCUMENTS

| | | |
|---|---|---|
| 11,021,365 B2 | 6/2021 | Van Willigenburg |
| 2009/0117024 A1 | 5/2009 | Weedon et al. |
| 2010/0126180 A1 | 5/2010 | Forsyth et al. |

OTHER PUBLICATIONS

U.S. Appl. No. 17/483,960, filed Sep. 24, 2021, Entitled "Hydrocarbon Reforming Processes with Shaft Power Production" Spicer.

U.S. Appl. No. 17/484,068, filed Sep. 24, 2021, Entitled "Amine CO2 Separation Process Integrated with Hydrocarbons Processing" Spicer et al.

IEAGHG Technical Review 2017-TR3 Mar. 2017 Reference Data and Supporting Literature Reviews for SMR Based Hydrogen Production with CCS, IEA Greenhouse Gas R&D Programme, 131 pages.

IEAGHG, "Techno-Economic Evaluation of SMR Based Stand-alone (Merchant) Plant with CCS", Feb. 2017, Feb. 2017, 286 pages.

Ullman's Encyclopedia of Industrial Chemistry, vol. 18, 2012, "Hydrogen, 2. Production" pp. 258-268.

INTEGRATION OF HYDROGEN-RICH FUEL-GAS PRODUCTION WITH OLEFINS PRODUCTION PLANT

FIELD

This disclosure relates to processes and systems for producing $H_2$-rich fuel gas from hydrocarbons such as natural gas, as well as processes and systems for producing olefins.

BACKGROUND

There exist many industrial processes that require the generation of very high temperatures. Many of these processes achieve the required high temperatures by the combustion of hydrocarbon fuel-gas. A fuel-gas commonly used is natural gas, which comprises primarily methane. In the combustion of methane, approximately 5.8 tons of $CO_2$ are generated for each 100 MBtu of heat released (lower heating value ("LHV") basis).

One such large scale manufacturing process is the production of light olefins (e.g. ethylene, propylene, etc.). The predominant method of manufacturing light olefins is via steam-cracking, where a hydrocarbon feed is heated to very high temperatures in the presence of steam. The high temperatures (>2100° F.) required to provide rapid heat input to steam-cracking furnaces (also known as pyrolysis reactors) are achieved by the combustion of fuel-gas. In many olefins production facilities the fuel-gas is internally generated as a byproduct of the cracking process, which can comprise primarily methane (e.g., 70-90 mol %) with a moderate hydrogen content (e.g., 10-30 mol %). A modern, world-scale olefins plant may have up to 10 steam-cracking furnaces, each of which may consume up to 150 MW or 512 MBtu/hour of fuel (LHV basis), and each of which has an individual flue-gas exhaust stack. Thus a modern olefins production facility can generate considerable quantity of $CO_2$ emissions over an extended operation period.

Various techniques have been proposed to reduce the net $CO_2$ emissions from steam cracking furnaces and olefins plants. Capturing $CO_2$ from the individual flue-gas stacks using an amine absorption and regeneration process has been proposed. This process has been demonstrated on the flue-gas stacks of electricity generation facilities. Once captured from the flue-gas stack, the $CO_2$ can be compressed, liquefied and can be sequestered in appropriate geological formations (i.e., Carbon Capture and Sequestration, "CCS"). Application of this technology to an olefins plant is extremely expensive given the potential to have 10 (or more) flue-gas stacks from which $CO_2$ must be captured, the low $CO_2$ concentration in the flue-gas, and the lack of available plot-space close to the steam-cracking furnaces in existing facilities. In particular, the large, internally insulated flue-gas ducting, with associated fans and isolation facilities required to transfer the large flue-gas volumes from the furnaces to the location of the amine absorption unit greatly increases the cost of the facilities.

An alternative approach has been proposed wherein a high-hydrogen fuel-gas stream is generated for combustion in the steam-cracking furnaces, thus facilitating the generation of the high temperatures required by the process but with appreciably reduced $CO_2$ emissions from the furnaces.

Hydrogen generation from natural-gas is practiced on an industrial scale via the process of steam reforming. A steam-methane reformer passes heated natural-gas (or another suitable hydrocarbon), in the presence of large volumes of steam, through tubes containing a suitable catalyst, to produce a synthesis gas containing hydrogen, carbon-monoxide, carbon-dioxide and unconverted methane. The process is typically practiced at pressures in the range of 300-400 psig. The process requires high temperatures, so it is normal for various waste-heat recovery heat exchangers to be employed in the reformer effluent stream. The waste heat recovery exchangers typically generate high-pressure steam (~600-650 psig) which is then superheated in the convection section of the reformer. Also in the reformer effluent stream, located at appropriate temperature conditions, it is normal to employ one or more "shift reactors" where, over a suitable catalyst, CO reacts with steam to produce additional hydrogen and $CO_2$. Following the shift reactor(s), the reformer effluent is further cooled to condense the contained steam, leaving a stream predominantly containing hydrogen and $CO_2$, but also containing unconverted methane and CO. In most industrial facilities a pressure-swing-absorption ("PSA") unit is then employed to recover high purity hydrogen (99+%) from the effluent stream. A so-called "PSA reject" stream is also generated, composed of $CO_2$, CO, unconverted methane and some hydrogen. Historically it has been normal to use the PSA reject stream as a portion of the fuel-requirement of the reformer.

While the steam-methane-reforming process for hydrogen production is well established, there remain several drawbacks to its use for large scale production of hydrogen rich fuel-gas for industrial applications. First, from the description above, it is clear that the process has a high capital cost, employing large reforming furnaces and multiple subsequent processing steps. Second, the combustion of fuel-gas to provide the high temperatures required in the reformer itself can be source of considerable amount of $CO_2$ emissions. Third, the PSA reject stream must be sent to a suitable disposition. Historically the PSA reject stream formed part of the fuel-gas supply to the reformer, but this further adds to the $CO_2$ emissions from the reformer itself.

The $CO_2$ emissions from the SMR can be reduced by installing an amine recovery system on the flue-gas discharged from the reformer stack. This approach further adds to the capital cost and operating expense of the system, particularly as the reformer stack gas is at low (ambient) pressure. The low operating pressure translates to large gas volumes and hence the amine contactor required to absorb the $CO_2$ becomes extremely large.

There is a need, therefore, for improved processes and systems for producing $H_2$-rich fuel gas and processes and systems for producing olefins. This disclosure satisfies this and other needs.

SUMMARY

We have found that an $H_2$-rich fuel gas production plant including a syngas production unit and an olefins production plant including a steam cracker can be integrated in at least one of the following areas: fuel gas supply and consumption; hydrocarbon feed supply and consumption; and steam supply and consumption, to achieve a surprisingly high level of savings in capital and operational costs and considerable improvement in energy efficiency and appreciable reduction in $CO_2$ emissions, compared to operating the two plants separately.

Thus, a first aspect of this disclosure relates to a process comprising one or more of the following: (I) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam; (II) cooling the reformed stream by using a waste heat recovery unit ("WHRU") to produce a cooled reformed stream and to generate a high-pressure steam ("HPS") stream; (III) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream; (IV) cooling the first shifted stream to obtain a cooled first shifted stream; (V) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream; (VI) abating steam present in the second shifted stream to produce a crude gas mixture stream comprising $CO_2$ and $H_2$; (VII) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream; and (VIII) supplying a portion of the $H_2$-rich stream to an olefins production plant comprising a steam cracker as at least a portion of a steam cracker fuel gas, and combusting the steam cracker fuel gas to provide thermal energy to the steam cracker.

DETAILED DESCRIPTION

Figure 1:
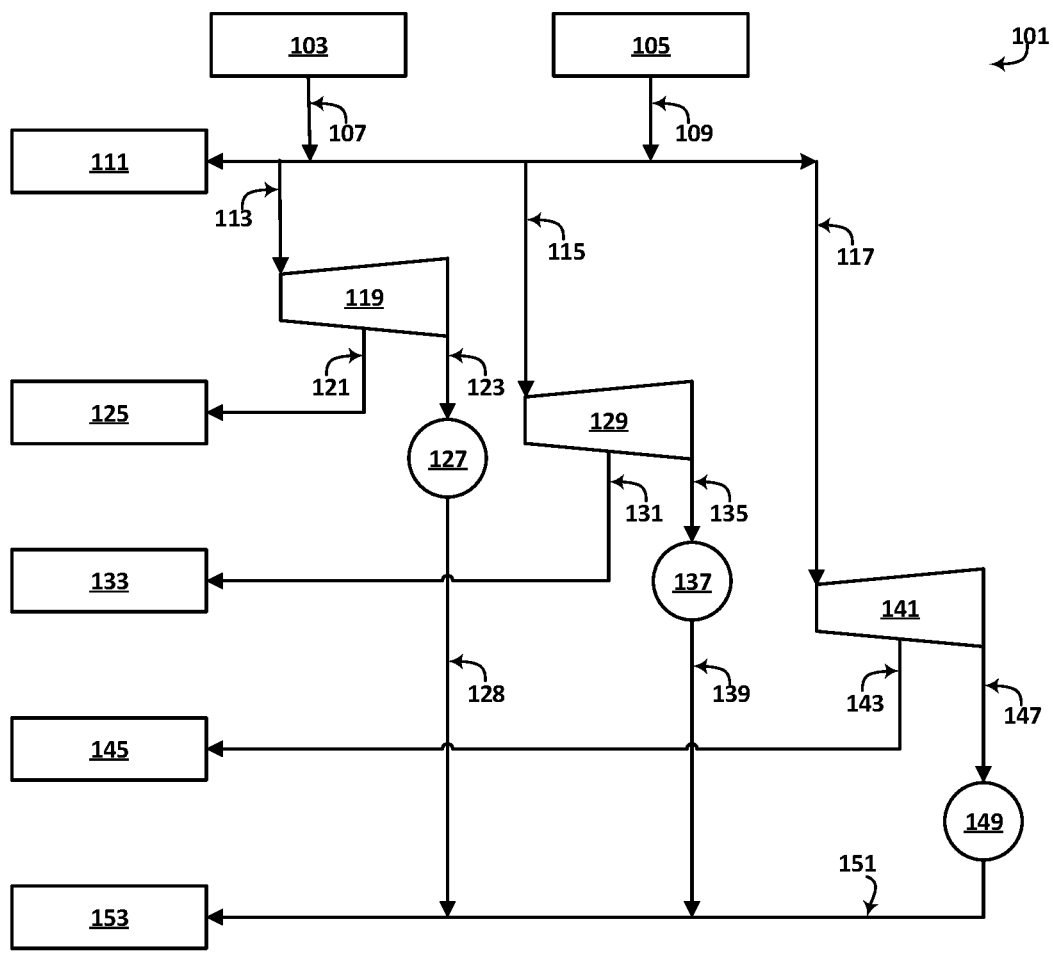
FIG. 1 schematically illustrates a steam supply/consumption system of a conventional olefins production plant including one or more steam cracker furnaces.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other steps, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for acquiring the measurement.

Certain embodiments and features are described herein using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

The indefinite article "a" or "an", as used herein, means "at least one" unless specified to the contrary or the context clearly indicates otherwise. Thus, embodiments using "a reactor" or "a conversion zone" include embodiments where one, two or more reactors or conversion zones are used, unless specified to the contrary or the context clearly indicates that only one reactor or conversion zone is used.

The term "hydrocarbon" means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a C2 hydrocarbon can be ethane, ethylene, acetylene, or mixtures of at least two of these compounds at any proportion. A "Cm to Cn hydrocarbon" or "Cm-Cn hydrocarbon," where m and n are positive integers and m<n, means any of Cm, Cm+1, Cm+2, . . . , Cn−1, Cn hydrocarbons, or any mixtures of two or more thereof. Thus, a "C2 to C3 hydrocarbon" or "C2–C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+hydrocarbon" means (i) any hydrocarbon compound comprising carbon atom(s) in its molecule at the total number of at least n, or (ii) any mixture of two or more such hydrocarbon compounds in (i). A "Cn-hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm-Cn hydrocarbon stream" means a hydrocarbon stream consisting essentially of Cm-Cn hydrocarbon(s).

For the purposes of this disclosure, the nomenclature of elements is pursuant to the version of the Periodic Table of Elements (under the new notation) as provided in Hawley's Condensed Chemical Dictionary, 16$^{th}$ Ed., John Wiley & Sons, Inc., (2016), Appendix V.

"Consisting essentially of" means comprising ≥60 mol %, preferably ≥75 mol %, preferably ≥80 mol %, preferably ≥90 mol %, preferably ≥95 mol %; preferably 98 mol %, of a given material or compound, in a stream or mixture, based on the total moles of molecules in the stream or mixture.

"High-pressure steam" and "HPS" are used interchangeably to mean a steam having an absolute pressure of at least 4000 kilopascal ("kPa"). "Super-high-pressure steam" and "Super-HPS" are used interchangeably to mean a steam having an absolute pressure of at least 8,370 kPa. Thus, a Super-HPS is an HPS. "Medium-pressure steam" and "MPS" are used interchangeably to mean a steam having an absolute pressure of at least 800 kPa but less than 4,000 kPa. "Low-pressure steam" and "LPS" are used interchangeably to mean a steam having an absolute pressure of at least 200 kPa but less than 800 kPa.

A "back-pressure steam turbine" means a steam turbine receiving a steam feed and producing no steam stream having an absolute pressure below 100 kPa and supplied to a surface condenser. Depending on the pressure of the steam feed and its configuration, a back-pressure steam turbine may produce one or more exhaust streams, e.g., an HPS stream, an MPS stream, and LPS stream, and combinations thereof. In this disclosure, unless the context clearly indicates otherwise, a turbine is a steam turbine.

An "extraction steam turbine" means a steam turbine receiving a steam feed and producing at least two exhaust steam streams having differing pressures. Depending on the pressure of the steam feed and its configuration, an extraction steam turbine may produce two or more steam streams including one or more of, e.g., an HPS stream, an MPS stream, an LPS stream, and an condensable stream having an absolute pressure below 100 kPa supplied to a surface condenser.

The Process and Plant for Producing a $H_2$-Rich Fuel Gas

One aspect of this disclosure is directed to a process for producing $H_2$-rich fuel gas comprising the following steps: (I) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam; (II) cooling the reformed stream by using a waste heat recovery unit ("WHRU") to produce a cooled reformed stream and to generate a high-pressure steam ("HPS") stream; (III) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream; (IV) cooling the first shifted stream to obtain a cooled first shifted stream; (V) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream; (VI) abating steam present in the second shifted stream to produce a crude gas mixture stream comprising $CO_2$ and $H_2$; and (VII) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream. A system for producing such an $H_2$-rich stream, preferably using the above process, may be called an $H_2$-rich fuel gas production plant in this disclosure.

Step (I) of this process includes supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam. The hydrocarbon feed can consist essentially of C1-C4 hydrocarbons (preferably saturated), preferably consists essentially of C1-C3 hydrocarbons (preferably saturated), preferably consists essentially of C1-C2 hydrocarbons (preferably saturated), and preferably consists essentially of $CH_4$. The hydrocarbon feed and the steam feed may be combined to form a joint stream before being fed into the syngas producing unit. Alternatively, they may be fed into the syngas producing unit as separate streams, in which they admix with each other to form a mixture. The feed stream(s) can be pre-heated by, e.g., a furnace, a heat exchanger, and the like, before being fed into the syngas producing unit. The syngas producing unit can comprise a pre-reformer first receiving the feed stream(s), especially if the hydrocarbon feed comprises significant amount of C2+ hydrocarbons. In a pre-reformer, the hydrocarbon feed/steam feed mixture contacts a pre-reforming catalyst under conditions such that the C2+ hydrocarbons are preferentially converted into $CH_4$. The inclusion of a pre-reformer can reduce coking and fouling of the down-stream reforming reactor. The hydrocarbon feed may have a temperature from, e.g., 15° C., 20° C., 30° C., 40° C., to 50° C., 60° C., 70° C., 80° C., 90° C., to 95° C., 100° C., 110° C., 120° C., 130° C., 140° C., or even 150° C., and an absolute pressure from e.g., 1,300 kPa, 1,400 kPa, 1,500 kPa, 1,600 kPa, 1,700 kPa, 1,800 kPa, 1,900 kPa, 2,000 kPa, to 2,100 kPa, 2,200 kPa, 2,300 kPa, 2,400 kPa, 2,500 kPa, 2,600 kPa, 2,700 kPa, 2,800 kPa, 2,900 kPa, 3,000 kPa, to 3,000 kPa, 3,200 kPa, 3,400 kPa, 3,500 kPa, 3,600 kPa, 3,800 kPa, 4,000 kPa, to 4,200 kPa, 4,400 kPa, 4,500 kPa, 4,600 kPa, 4,800 kPa, or even 5,000 kPa. The steam feed may have a temperature from, e.g., 250° C., 260° C., 270° C., 280° C., 290° C., 300° C., to 310° C., 320° C., 330° C., 340° C., 350° C., 360° C., 370° C., 380° C., 390° C., to 400° C., 410° C., 420° C., 430° C., 440° C., or even 450° C., and an absolute pressure from e.g., 1,300 kPa, 1,400 kPa, 1,500 kPa, 1,600 kPa, 1,700 kPa, 1,800 kPa, 1,900 kPa, 2,000 kPa, to 2,100 kPa, 2,200 kPa, 2,300 kPa, 2,400 kPa, 2,500 kPa, 2,600 kPa, 2,700 kPa, 2,800 kPa, 2,900 kPa, 3,000 kPa, to 3,000 kPa, 3,200 kPa, 3,400 kPa, 3,500 kPa, 3,600 kPa, 3,800 kPa, 4,000 kPa, to 4,200 kPa, 4,400 kPa, 4,500 kPa, 4,600 kPa, 4,800 kPa, or even 5,000 kPa. Preferably, the steam feed is a superheated steam.

The effluent from the pre-reformer can be then fed into the reforming reactor operated under syngas producing conditions, wherein the forward reaction of the following is favored and desirably occurs in the presence of the reforming catalyst:

$$CH_4 + H_2O \xrightleftharpoons{\text{Reforming Catalyst}} CO + 3 H_2 \quad (R\text{-}1)$$

The syngas producing condition can include a temperature of, e.g., from 750° C., 760° C., 780° C., 800° C., 850° C., 900° C., to 950° C., 1,000° C., 1,050° C., 1,100° C., to 1150° C., or even 1200° C., and an absolute pressure of, e.g., from 700 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, in the reforming reactor, depending on the type of the reforming reactor and the syngas producing conditions. A lower pressure in the reformed stream, and hence a lower pressure in the reforming reactor, is conducive to a higher conversion of $CH_4$ in reforming reactor and hence a lower residual $CH_4$ concentration in the reformed stream. The reformed stream exiting the reforming reactor therefore comprises CO, $H_2$, residual $CH_4$ and $H_2O$, and optionally $CO_2$ at various concentrations depending on, among others, the type of the reforming reactor and the syngas producing conditions. The reformed stream can have a temperature of, e.g., from 750° C., 760° C., 780° C., 800° C., 850° C., 900° C., to 950° C., 1,000° C., 1,050° C., 1,100° C., to 1150° C., or even 1200° C., and an absolute pressure of, e.g., from 700 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, depending on the type of the reforming reactor and the syngas producing conditions.

A preferred type of the reforming reactor in the syngas producing unit is an SMR. An SMR typically comprises one or more heated reforming tubes containing the reforming catalyst inside. The hydrocarbon/steam feed stream enters the tubes, heated to a desired elevated temperature, and passes through the reforming catalyst to effect the desirable reforming reaction mentioned above. While an SMR can have many different designs, a preferred SMR comprises a furnace enclosure, a convection section (e.g., an upper convection section), a radiant section (e.g., a lower radiant section), and one or more burners located in the radiant section combusting a fuel to produce a hot flue gas and supply thermal energy to heat the radiant section and the convection section. The hydrocarbon/steam feed stream enters the reforming tube at a location in the convection section, winds downwards through the convection section, whereby it is pre-heated by the ascending hot flue gas produced from fuel combustion at the burner(s), and then enters the radiant section proximate the burners combustion flames, whereby it contacts the reforming catalyst loaded in the reforming tube(s) in the radiant section, to produce a reformed stream exiting the SMR from a location in the radiant section. The syngas producing conditions in the reforming tube(s) in the radiant section can include a temperature of, e.g., from 750° C., 760° C., 780° C., 800° C., to 820° C., 840° C., 850° C., to 860° C., 880° C., or even 900° C., and an absolute pressure of, e.g., from 700 kPa, 800 kPa, 900 kPa, 1,000 kPa, to 1,500 kPa, 2,000 kPa, 2,500 kPa, 3,000 kPa, or even 3,500 kPa. To achieve a high $CH_4$ conversion in the SMR, and a low $CH_4$ concentration in the $H_2$-rich stream produced from the process, the syngas producing conditions in the SMR preferably includes an absolute pressure of ≤2,169 kPa (300 psig), more preferably ≤1,825 kPa (250 psig). Description of an SMR can be found in, e.g., The International Energy Agency Greenhouse Gas R&D Program ("IEAGHG"), "Techno-Economic Evaluation of SMR Based Standalone (Merchant) Plant with CCS", February 2017; and IEAGHG, "Reference data and supporting literature Reviews for SMR based Hydrogen production with CCS", 2017-TR3, March 2017, the contents of which are incorporated herein in their entirety.

The reforming reactor in the syngas producing unit may comprise an autothermal reformer ("ATR"). An ATR typically receives the hydrocarbon/steam feed(s) and an $O_2$ stream into a reaction vessel, where a portion of the hydrocarbon combusts to produce thermal energy, whereby the mixture is heated to an elevated temperature and then allowed to contact a bed of reforming catalyst to effect the desirable reforming reaction and produce a reformed stream exiting the vessel. An ATR can be operated at a higher temperature and pressure than an SMR. The syngas producing conditions in the ATR and the reformed stream exiting an ATR can have a temperature of, e.g., from 800° C., 850° C., 900° C., to 950° C., 1,000° C., 1050° C., to 1,100° C., 1,150° C., or even 1,200° C., and an absolute pressure of, e.g., from 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. Commercially available ATRs, such as the Syncor™ ATR available from Haldor Topsoe, having an address at Haldor Topsøes Allé 1, DK-2800, Kgs. Lyngby, Denmark ("Topsoe"), may be used in the process of this disclosure.

The syngas producing unit used in step (I) of the process of this disclosure can include one or more SMR only, one or more ATR only, or a combination of one or more of both.

The reformed stream exiting the reforming reactor has a high temperature and high pressure as indicated above. It is highly desirable to capture the heat energy contained therein. Thus, in step (II), the reformed stream passes through a waste heat recovery unit ("WHRU") to produce a cooled reformed stream and to generate a high-pressure steam ("HPS") stream.

The cooled reformed stream can have a temperature from, e.g., 285° C., 290° C., 300° C., to 310° C., 320° C., 330° C., 340° C., 350° C., to 360° C., 370° C., 380° C., 390° C., or even 400° C. The cooled reformed stream can have a pressure substantially the same as the reformed stream exiting the reforming reactor. The WHRU can include, e.g., one or more heat exchanger and one or more steam drum in fluid communication with the heat exchanger. The steam drum supplies a water stream to the heat exchanger, where it is heated and a water/steam stream can be then returned to the steam drum, where steam is separated from liquid phase water. The HPS stream can have an absolute pressure from, e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. The thus produced HPS stream is a saturated steam stream. To make the HPS stream more useful, it may be further heated to produce a superheated HPS ("SH-HPS") stream in, e.g., a furnace. In case the syngas producing unit comprises an SMR having a convection section as described above, the saturated HPS stream may be advantageously superheated in the convection section of the SMR and/or in an auxiliary furnace. In case the syngas producing unit comprises one or more ATR but no SMR, the saturated HPS stream can be superheated in an auxiliary furnace. The auxiliary furnace can include one or more burners combusting a fuel gas stream to supply the needed thermal energy as is known to one skilled in the art. The SH-HPS stream can have one of both of: (i) a temperature from, e.g., 350° C., 360° C., 370° C., 380° C., 390° C., 400° C., to 410° C., 420° C., 430° C., 440° C., 450° C., to 460° C., 470° C., 480° C., 490° C., 500° C., to 510° C., 520° C., 530° C., 540° C., or even 550° C.; and (ii) an absolute pressure from, e.g., e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa.

In step (III) of the process of this disclosure, the cooled reformed stream contacts a first shifting catalyst in a first shift reactor under a first set of shifting conditions to produce a first shifted stream exiting the first shift reactor. The first set of shifting conditions includes the presence of a first shift catalyst. Any suitable shift catalyst known to one skilled in the art may be used. Non-limiting examples of suitable shift catalyst for the first shifting catalyst are high temperature shift catalysts available from, e.g., Topsoe. The forward reaction of the following preferentially occur in the first shift reactor:

(R-2)

As such, the first shifted stream has a lower CO concentration and a higher $CO_2$ concentration than the cooled reformed stream. The forward reaction of (R-2) is exothermic, resulting in the first shifted stream having a temperature higher than the cooled reformed stream entering the first shift reactor. The first shifted stream exiting the first shift reactor can have a temperature from, e.g., 335° C., 340° C., 350° C., 360° C., to 370° C., 380° C., 400° C., 420° C., to 440° C., 450° C., 460° C., 480° C., or even 500° C. The first shifted stream can have an absolute pressure substantially the same as the cooled reformed stream.

While a single stage of shift reactor may convert sufficient amount of CO in the cooled reformed stream to $CO_2$ resulting in a low CO concentration in the first shifted stream, it is preferable to include at least two stages of shift reactors in the processes of this disclosure to achieve a high level of conversion of CO to $CO_2$, and eventually to produce a $H_2$-rich fuel gas stream with low CO concentration. It is further preferred that a subsequent stage, such as the second shift reactor downstream of the first shift reactor is operated at a temperature lower than the first shift reactor, whereby additional amount of CO in the first shifted stream is further converted into $CO_2$ and additional amount of $H_2$ is produced. To that end, the first shifted stream is preferably first cooled down in step (IV) to produce a cooled first shifted stream. Such cooling can be effected by one or more heat exchangers using one or more cooling streams having a temperature lower than the first shifted stream. In one preferred embodiment, the first shifted stream can be cooled by the hydrocarbon stream or a split stream thereof to be fed into the syngas producing unit. Alternatively or additionally, the first shifted stream can be cooled by a boiler water feed stream to produce a heated boiler water stream, a steam stream, and/or a water/steam mixture stream. The thus heated boiler water stream can be heated in a boiler to produce steam at various pressure. The thus heated boiler water stream, steam stream, and/or water/steam mixture stream can be further heated by another process stream in another heat exchanger to produce steam. In one preferred embodiment, the heated boiler water stream and/or steam stream can be fed into the steam drum of the WHRU extracting heat from the reformed stream as described above, where the boiler feedwater can be sent to the WHRU exchanger for further heating, and any steam separated in the steam drum can be further superheated. The cooled first shifted stream can have a temperature from, e.g., 150° C., 160° C., 170° C., 180° C., 190° C., 200° C., to 210° C., 220° C., 230° C., 240° C., or even 250° C., and a pressure substantially the same as the first shifted stream.

The cooled first shifted stream is then subjected to a low-temperature shifting in a second shift reactor under a second set of shifting conditions to produce a second shifted stream. The second set of shifting conditions includes the presence of a second shift catalyst, which may be the same or different from the first shift catalyst. Any suitable shift catalyst known to one skilled in the art may be used. Non-limiting examples of suitable catalyst for the second shifting catalyst are low temperature shift catalysts available from, e.g., Topsoe. The forward reaction of the following preferentially occur in the second shift reactor:

(R-3)

As such, the second shifted stream has a lower CO concentration and a higher $CO_2$ concentration than the cooled first shifted stream. The forward reaction of (R-3) is exothermic, resulting in the second shifted stream having a temperature higher than the cooled first shifted stream entering the second shift reactor. The second shifted stream exiting the second shift reactor can have a temperature from, e.g., e.g., 150° C., 160° C., 170° C., 180° C., 190° C., 200 ° C., to 210° C., 220° C., 230° C., 240° C., 250° C., to 260° C., 270° C., 280° C., 290° C., or even 300° C. The second shifted stream can have an absolute pressure substantially the same as the cooled first shifted stream.

The second shifted stream comprises $H_2$, $CO_2$, CO, steam, and optionally $CH_4$. In step (VI), steam is then abated from it by cooling and separation. Similar to step (IV) of cooling the first shifted stream, such cooling of the second shifted stream can be effected by one or more heat exchangers using one or more cooling streams having a temperature lower than the second shifted stream. In one preferred embodiment, the second shifted stream can be cooled by the hydrocarbon stream or a split stream thereof to be fed into the syngas producing unit. Alternatively or additionally, the second shifted stream can be cooled by a boiler water feed stream to produce a heated boiler water stream, a steam stream, and/or a water/steam mixture stream. The thus heated boiler water stream can be heated in a boiler to produce steam at various pressure. The thus heated boiler water stream, steam stream, and/or water/steam mixture stream can be further heated by another process stream in another heat exchanger to produce steam. In one preferred embodiment, the heated boiler water stream and/or steam stream can be fed into the steam drum of the WHRU extracting heat from the reformed stream as described above, where the boiler feedwater can be sent to the WHRU exchanger for further heating, and any steam separated in the steam drum can be further superheated. Alternatively or additionally, cooling water exchangers or air-fin heat exchangers can be used to at least partly cool the second shifted syngas stream. The cooled second shifted stream can preferably comprise water condensate, which can be separated to produce a crude gas mixture stream comprising steam at a significantly lower concentration than the second shifted stream exiting the second shift reactor.

The crude gas mixture stream thus consists essentially of $CO_2$, $H_2$, optionally $CH_4$ at various amounts, and steam and CO as minor components. The crude gas mixture stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. In step (VII), one can recover a portion of the $CO_2$ therein to produce a $CO_2$ stream and a $H_2$-rich stream. Any suitable $CO_2$ recovery process known to one skilled in the art may be used in step (VII), including but not limited to: (i) amine absorption and regeneration process; (ii) a cryogenic $CO_2$ separation process; (iii) a membrane separation process; (iv) a physical absorption and regeneration process; and (iv) any combination any of (i), (ii), and (iii) above. In a preferred embodiment, an amine absorption and regeneration process may be used. Due to the elevated pressure of the crude gas mixture stream, the size of the $CO_2$ recovery equipment can be much smaller than otherwise required to recover $CO_2$ from a gas mixture at atmospheric pressure.

The $CO_2$ stream preferably comprises $CO_2$ at a molar concentration of from, e.g., 90%, 91%, 92%, 93%, 94%, to 95%, 96%, 97%, 98%, or even 99%, based on the total moles of molecules in the $CO_2$ stream. The $CO_2$ stream can comprise at least one and preferably all of, on a molar basis: (i) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of CO; (ii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, 5.0%, 5.5%, or even 6.0% of $H_2O$; and (iii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of $CH_4$. The $CO_2$ stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. The $CO_2$ stream can be compressed, liquefied, conducted away, stored, sequestered, or utilized in any suitable applications known to one skilled in the art. In one embodiment, the $CO_2$ stream, upon optional compression, can be conducted away in a $CO_2$ pipeline. In another embodiment, the $CO_2$ stream, upon optional compression and/or liquefaction, can be injected and stored in a geological formation. In yet another embodiment, the $CO_2$ stream, upon optional compression and/or liquefaction, can be used in extracting hydrocarbons present in a geological formation. Another exemplary use of the $CO_2$ stream is in food applications.

The $H_2$-rich stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. The $H_2$-rich stream preferably comprises $H_2$ at a molar concentration of from, e.g., 80%, 81%, 82%, 83%, 84%, 85%, to 86%, 87%, 88%, 89%, 90%, to 91%, 92%, 93%, 94%, 95%, to 96%, 97%, or even 98%, based on the total moles of molecules in the $H_2$-rich stream. The $H_2$-rich stream can comprise at least one and preferably all of, on a molar basis: (i) e.g., from 0.1%, 0.2%, 0.3%, 0.4%, 0.5%, 0.6%, 0.7%, 0.8%, 0.9%, to 1.0%, 1.5%, 2.0%, 2.5%, or even 3.0%, of CO; (ii) e.g., from 0.1%, 0.2%, 0.3%, 0.4%, 0.5%, to 0.6%, 0.7%, 0.8%, 0.9%, or even 1.0%, of $CO_2$; and (iii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of $CH_4$. One specific example of a $H_2$-rich stream that may be produced from the process of this disclosure has the following molar composition: 0.25% of $CO_2$; 1.75% of CO; 93.87% of $H_2$; 0.23% of $N_2$; 3.63% of $CH_4$; and 0.29% of $H_2O$.

Where an even higher purity $H_2$ stream is desired, a portion of the $H_2$-rich stream can be further purified by using processes and technologies known to one skilled in the art, e.g., pressure-swing-separation.

Preferably, however, the $H_2$-rich stream, notwithstanding the optional low concentrations of CO, $CO_2$, and $CH_4$, is used as a fuel gas stream without further purification to provide heating in step (VIII) of the process in, e.g., residential, office, and/or industrial applications, preferably industrial applications. Due to the considerably reduced combined concentrations of CO, $CO_2$, and $CH_4$ therein compared to conventional fuel gases such as natural gas, the flue gas stream produced from combusting the $H_2$-rich stream can comprise $CO_2$ at a considerably reduced concentration, resulting in appreciably lower $CO_2$ emission to the atmosphere. Thus, the flue gas stream can comprise $CO_2$ at a molar concentration from, e.g., 0.01%, 0.05%, to 0.1%, 0.2%, 0.3%, 0.4%, 0.5%, 0.6%, 0.7%, 0.8%, 0.9%, to 1%, 2%, 3%, 4%, 5%, 6%, 7%, 8%, 9%, 10%, to 11%, 12%, 13%, 14%, 15%, 16%, 17%, 18%, 19%, or 20%, preferably ≤10%, preferably ≤5%, preferably ≤3%, based on the total moles of $CO_2$ and $H_2O$ in the flue gas stream. The combustion may be in the presence of, e.g., air, $O_2$-enhanced air, high-purity $O_2$, and the like, depending on the specific application.

For use as a fuel gas stream, the $H_2$-rich stream may preferably have an absolute pressure of ≤1,135 kPa (150 psig), preferably ≤790 kPa (100 psig). To achieve such low pressure of the $H_2$-rich stream, it is feasible to design a syngas producing unit upstream comprising an SMR and/or an ATR operating under syngas producing conditions including a relatively low pressure, e.g., an absolute pressure of ≤2,169 kPa (300 psig), preferably ≤1,825 kPa (250 psig). As mentioned above, a lower pressure in the reforming reactor results in a higher $CH_4$ conversion in the reforming reactor, and hence a low residual $CH_4$ concentration in the $H_2$-rich stream.

Preferably, the $H_2$-rich stream is supplied to at least one, preferably a majority, preferably all, of the combustion devices used in the process/system for producing the $H_2$-rich stream. Thus, where the syngas producing unit comprises a pre-reformer including a furnace heated by one or more burners combusting a fuel gas, preferably a portion of the $H_2$-rich stream is supplied as at least a portion, preferably a majority, preferably the entirety, of the fuel gas to such burners. Where the syngas producing unit includes an SMR comprising one or more SMR burners combusting a SMR fuel, it is highly desirable to supply a portion of the $H_2$-rich stream as at least a portion, preferably a majority, preferably the entirety, of the SMR fuel. Where the $H_2$-rich stream production process/system uses an additional boiler or auxiliary furnace combusting a fuel gas, it is desirable to supply a portion of the $H_2$-rich stream as at least a portion, preferably a majority, preferably the entirety, of the fuel gas. By combusting the $H_2$-rich stream and capturing the $CO_2$ stream, the $H_2$-rich stream production process/system of this disclosure can reach an appreciably reduced level of $CO_2$ emission to the atmosphere than conventional $H_2$ production processes combusting natural gas.

Compared to existing syngas and/or $H_2$-rich fuel gas producing processes, especially those combusting a hydrocarbon-containing fuel, the $H_2$-rich fuel gas production process of this disclosure has at least one of the following advantages: (i) lower capital investment and production cost due to, e.g., an absence of a PSA unit, a small-size $CO_2$ recovery unit, and operating the syngas producing unit, the first shift reactor, and the second shift gas reactor under relatively low pressure; and (ii) considerably lower $CO_2$ emission if the $CO_2$ stream is captured, stored, sequestered, and/or utilized.

II. Integration of an $H_2$-rich Fuel Gas Production Plant with an Olefins Production Plant A modern olefins production plant typically operates by feeding a hydrocarbon feed (e.g., ethane, propane, butanes, naphtha, crude oil, and mixtures and combinations thereof) and steam into a steam cracker, heating the hydrocarbon feed/steam mixture to an elevated cracking temperature for a desirable residence time, thereby cracking the hydrocarbon feed to produce a steam cracker effluent comprising $H_2$, $CH_4$, ethane, propane, butanes, C2-C4 olefins, C4 dienes, and C5+ hydrocarbons exiting the pyrolysis reactor. The heating can include a preheating step in the convection section of the steam cracker, followed by transfer to the radiant section, where additional heating to the elevated cracking temperature and cracking occur. The thermal energy need for the preheating in the convection section and the heating in the radiant section is typically provided by a plurality of steam cracker burners combusting a steam cracker fuel gas. The high-temperature steam cracker effluent is immediately cooled down by quenching and/or indirect heat exchange, and separated to produce, among others, a process gas stream comprising C1-C4 hydrocarbons. The process gas stream is then typically compressed and supplied to a product recovery section including a chill train and multiple distillation columns such as a demethanizer, a deethanizer, a depropanizer, a C2 splitter, a C3 splitter, to name a few, from which one of more of the following may be produced: (i) a steam-cracker $H_2$ stream, which may preferably comprise $H_2$ at a molar concentration of from, e.g., 80%, 81%, 82%, 83%, 84%, 85%, to 86%, 87%, 88%, 89%, 90%, to 91%, 92%, 93%, 94%, 95%, to 96%, 97%, or even 98%, based on the total moles of molecules in the steam-cracker $H_2$ stream; (ii) a $CH_4$-rich stream (sometimes referred to as a "tailgas stream") comprising $CH_4$ at a molar concentration from, e.g., 50%, 55%, 60%, 65%, 70%, to 75%, 80%, 85%, 90%, to 91%, 92%, 93%, 94%, 95%, 96%, 97%, or even 98%, based on the total moles of molecules in the $CH_4$-rich stream; (ii) an ethane stream; (iii) an ethylene product stream; (iv) a propane stream; and (v) a propylene product stream. Many configurations of the recovery sections are possible. The steam-cracker $H_2$ stream may comprise, on a molar basis, e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, 5.0%, to 6.0%, 8.0%, 10%, 12%, 14%, 15%, to 16%, 17%, 18%, 19%, or even 20% of $CH_4$. Preferably the steam-cracker $H_2$ stream is substantially free of $CO_2$ and CO, e.g., comprising $CO_2$ and CO at a combined concentration from 0 to no greater than 1% by mole, based on the total moles of molecules in the steam-cracker $H_2$ stream. The $CH_4$-rich stream may comprise at least one and preferably all of, on a molar basis: (i) e.g., from 1%, 5%, 10%, 15%, to 20%, 25%, 30%, to 35%, or even 40%, 45% $H_2$; (ii) e.g., from 0.1%, 0.5%, 1%, to 2%, 3%, 4%, 5%, to 6%, 7%, 8%, 9%, or 10% ethane; and (iii) e.g., from 0.01%, 0.05%, 0.1%, to 0.2%, 0.5%, 1%, to 2%, 3%, 4%, or 5% CO, based on the total moles of molecules in the $CH_4$-rich stream.

II.1 Fuel Gas Integration

The $H_2$-rich fuel gas production process/plant of this disclosure, as described in section I above, can be advantageously integrated with an olefins production plant to achieve an enhanced level of energy efficiency and a reduced level of $CO_2$ emissions to the atmosphere, compared to previous processes/systems and operating them separately regardless of the specific configuration of the recovery section in the plant.

In certain preferred embodiments, a portion of the $H_2$-rich stream may be combined with a portion of the steam-cracker $H_2$ stream to form a joint $H_2$-rich stream, which can be used as a fuel gas for residential, office, and/or industrial heating applications, particularly industrial heating applications such as in an olefins production plant.

In one particularly desirable embodiment, a portion of the $H_2$-rich stream, the steam-cracker $H_2$ stream, or the joint $H_2$-rich stream can be supplied to one of more of the steam cracker burners as at least a portion, preferably a majority, preferably the entirety, of the steam cracker fuel gas. A steam cracker can consume large quantity of the steam cracker fuel gas, which hitherto tends to comprise substantial quantity of hydrocarbons such as $CH_4$. By substituting a portion, preferably majority, preferably the entirety, of the steam cracker fuel gas with the $H_2$-rich stream, the steam-cracker $H_2$ stream, and/or the joint $H_2$-rich stream, each containing low concentrations of carbon-containing species, considerable reduction of $CO_2$ emission from the steam cracker flue gas can be achieved. In certain embodiments, the steam cracker may preferably be equipped with a combustion air pre-heater to reduce the fuel consumption requirements of the steam cracker. The combustion air pre-heater can preferably provide heating by electrical heating and/or exchanging heat with a warmer stream such as: the flue-gas of the same or different furnace; a steam stream (preferably a low-pressure steam stream), a hot water stream, and/or a hot oil stream.

An olefins production plant may include one or more boilers and/or auxiliary furnaces combusting a fuel gas in addition to the steam cracker. In such case, it is highly advantageous to supply a portion of the $H_2$-rich stream, the steam-cracker $H_2$ stream, and/or the joint $H_2$-rich stream to such boilers and/or auxiliary furnaces as a portion, preferably a majority, preferably the entirety, of the fuel gas needed. Doing so can further reduce $CO_2$ emission to the atmosphere from the olefins production plant.

An olefins production plant may comprise a combined-cycle power plant comprising one or more duct burners combusting a duct burner fuel to generate thermal energy. In such case, it is highly advantageous to supply a portion of the $H_2$-rich stream, the steam-cracker $H_2$ stream, and/or the joint $H_2$-rich stream to the duct burners as a portion, preferably a majority, preferably the entirety, of the duct burner fuel needed.

In certain embodiments, the $H_2$-rich stream and/or the steam-cracker $H_2$ stream can supply from, e.g., 60%, 65%, 70%, to 75%, 80%, 85%, to 90%, 95%, 98%, 99%, or even 100%, of the total fuel gas required, on a Btu basis, in the olefins production plant. In certain embodiments, the $H_2$-rich stream can supply from, e.g., 60%, 65%, 70%, to 75%, 80%, 85%, to 90%, 95%, 98%, 99%, or even 100%, of the total fuel gas required, on a Btu basis, in the olefins production plant.

In the following TABLE I, the $CO_2$ footprint of a steam cracker combusting the following fuel gases emitting flue gases produced from the combustion are compared: (i) only a typical natural gas ("Natural Gas"); (ii) only a tailgas produced from a steam cracker receiving a typical naphtha steam-cracking feed ("Tailgas"); (iii) a CO-rich fuel gas produced from a comparison process including a syngas producing unit followed by a single stage of high-temperature shift reactor, and then followed by $H_2O$ abatement and $CO_2$ recovery ("CO-Rich Fuel"); and (iv) a $H_2$-rich stream made by the process of this disclosure ("$H_2$-Rich Fuel"). In all cases the following is assumed: 2.0 wet vol % excess $O_2$, 60° F. (16° C.) air & fuel gas.

As can be seen from TABLE I, compared to all other three fuel gases, the $H_2$-rich stream made by the process of this disclosure has a considerably smaller $CO_2$ footprint from the emission of the flue gas produced by the combustion. Even though the $H_2$-Rich Fuel only comprises $H_2$ at a lightly higher concentration and CO at a slightly lower concentration than the comparative CO-Rich Fuel, the $H_2$-Rich Fuel demonstrated a markedly lower $CO_2$ footprint (40% lower). This shows a significant advantage of the process of this disclosure utilizing at least two stages of shift reactors compared to using a single stage of high-temperature shift reactor only. While it is possible to purify the CO-Rich Fuel further to produce a fuel gas having a higher $H_2$ concentration and a lower CO concentration comparable to the $H_2$-Rich Fuel by using additional equipment such as a PSA unit, the installation and operation of a PSA unit add much more investment and operation costs and reduce the energy efficiency of the process than the addition of the second shift reactor. Therefore, the process of this disclosure achieves the production of a $H_2$-rich fuel gas with low $CO_2$ footprint with a reduced cost and enhanced energy efficiency.

TABLE 1

| Fuel Gas | | Natural Gas | Tailgas | CO-Rich Fuel | $H_2$-Rich Fuel |
|---|---|---|---|---|---|
| Composition (mol %) | Hydrogen | 0.00 | 26.26 | 90.08 | 93.85 |
| | Methane | 94.11 | 73.33 | 3.63 | 3.63 |
| | Ethane | 4.76 | 0.23 | 0.00 | 0.00 |
| | Propane | 0.64 | 0.03 | 0.00 | 0.00 |
| | Butane | 0.30 | 0.02 | 0.00 | 0.00 |
| | Ethylene | 0.00 | 0.05 | 0.00 | 0.00 |
| | Propylene | 0.00 | 0.00 | 0.00 | 0.00 |
| | Butene | 0.00 | 0.00 | 0.00 | 0.00 |
| | Carbon Monoxide | 0.00 | 0.08 | 5.52 | 1.75 |
| | Nitrogen | 0.19 | 0.00 | 0.23 | 0.23 |
| | Carbon Dioxide | 0.00 | 0.00 | 0.25 | 0.25 |
| | Water Vapor | 0.00 | 0.00 | 0.29 | 0.29 |
| | Total | 100.00 | 100.00 | 100.00 | 100.00 |
| LHV (Btu/lb) | | 21295.5 | 22740.6 | 27059.5 | 35175.5 |
| Lb fuel/MBtu | | 46.96 | 43.97 | 36.96 | 28.43 |
| Lb flue-gas/Lb fuel | | 20.16 | 21.17 | 21.70 | 28.06 |
| Lb flue-gas/MBtu | | 946.5 | 930.8 | 801.9 | 797.7 |
| Flue-gas wt % $CO_2$ | | 13.68 | 12.41 | 4.57 | 2.77 |
| Flue-gas vol % $CO_2$ | | 8.60 | 7.72 | 2.66 | 1.59 |
| $CO_2$ Footprint | Lb/MBtu | 129.49 | 115.51 | 36.65 | 22.10 |
| | Lb/MBtu as % of Natural Gas Firing | 100 | 89 | 28 | 17 |
| | Lb/MBtu as % of Tailgas firing | 112 | 100 | 32 | 19 |
| | Lb/MBtu as % of CO-Rich Fuel Firing | 353 | 315 | 100 | 60 |

II.2 Hydrocarbon Feed Integration

In one particularly advantageous embodiment, the $CH_4$-rich stream produced from the olefins production plant may be fed into the syngas producing unit as at least a portion of the hydrocarbon feed, along with, e.g., a natural gas stream. Since the $CH_4$-rich stream from the olefins production plant can be substantially free of sulfur, it can be advantageously fed into the syngas producing unit after the sulfur-removal unit, if any. If the $CH_4$-rich comprises C2+ hydrocarbons (e.g., ethane) at a low molar concentration, e.g., ≤3%, ≤2%, <1%, <0.5%, <0.1%, e.g., from 0.01%, 0.02%, 0.04%, 0.05%, to 0.06%, 0.08%, 0.1%, to 0.2%, 0.4%, 0.5%, to 0.6%, 0.8%, 1%, 2%, or even 3%, based on the total moles of hydrocarbons in the $CH_4$-rich stream, then the $CH_4$-rich stream can be supplied to the reforming reactor at a location downstream of the pre-reformer, if any, because of the reduced need to convert the C2+ hydrocarbons in the pre-reformer. The $CH_4$-rich stream may comprise $H_2$ at various quantities, as indicated above. However, it is not necessary to remove the $H_2$ from the $CH_4$-rich stream before it is fed to the SMR. Excess hydrogen in the $CH_4$-rich stream can consume hydraulic capacity in the SMR and hence is undesirable. But a small amount of hydrogen (preferably ≤10 mol %, preferably ≤5 mol %, based on the total moles of molecules in the $CH_4$-rich stream) is acceptable, and may actually serve to minimize the potential for coke or foulant generation in the SMR.

In certain embodiments, the $CH_4$-rich stream may have a pressure higher than the pressure of the hydrocarbon feed required for feeding into the syngas producing unit. In such case, it is highly advantageous to expand the $CH_4$-rich stream in a turbo-expander and/or a Joule-Thompson valve to produce a cooled $CH_4$-rich stream having a pressure in the vicinity of the pressure of the hydrocarbon feed. The cooled $CH_4$-rich stream may be heated by using, e.g., any stream in the olefins production plant or the $H_2$-rich production unit having a temperature higher than the cooled $CH_4$-rich stream, and then supplied to the syngas producing unit.

In certain embodiments, the $CH_4$-rich stream may have a pressure lower than the pressure of the hydrocarbon feed required for feeding into the syngas producing unit. In such case, it is desirable to compress the $CH_4$-rich stream to a pressure in the vicinity of the pressure of the hydrocarbon feed before feeding it to the syngas producing unit.

II.3 Steam Integration

In an olefins production plant including one more steam crackers, a steam cracker receives a hydrocarbon feed and steam, cracks the hydrocarbons under steam cracking conditions to produce a steam cracker effluent exiting the steam cracker. The high-temperature steam cracker effluent is immediately cooled by quenching and/or an indirect heat exchanger, where a significant amount of steam may be generated, which can be subsequently superheated in the convection section of the steam cracker. The cooled steam cracker effluent can be then separated to produce, among others, a process gas stream comprising $H_2$, methane, ethane, C2-C4 olefins and dienes. To recover the olefins products from the process gas stream, it is typically first compressed to an elevated pressure, cooled in a chill train under cryogenic conditions, and then separated in distillation columns such as a demethanizer, a deethanizer, a depropanizer, a C2 splitter, a C3 splitter, and the like. To that end, at least three (3) large gas compressors: a process gas compressor ("PGC"), a propylene refrigeration compressor ("PRC") and an ethylene refrigeration compressor ("ERC") may be used. In a modern, world scale olefins plant, the combined shaft power of these compressors can exceed 100 MW (134,000 hp). This very high shaft power demand is a characteristic of olefins production plants, and differentiates them from most other petrochemical facilities. Typically the large compressors are driven by steam-turbines. The majority of the steam can be generated by the steam produced from cooling the steam cracker effluent as described above. If necessary, boilers are used to make-up the required steam volumes.

Because of the large shaft power requirements of the major compressors, for efficient olefin production it is important that the steam-power cycle be as efficient as possible. A multi-pressure-level steam system with the highest steam pressure level being nominally 100 BarG (1500 psig, or 10.3 MPaG) or higher may be advantageously used. This Super-HPS may be superheated in order to maximize the specific power output (kW power/kg steam consumed) of the turbines. In addition to the large compressor steam turbines, smaller turbine drivers may be used for several services within the olefins production plant (e.g.: cooling water pumps, quench water pumps, boiler-feed water pumps, air compressors, etc.). These turbines can receive HPS, MPS, or LPS streams. In addition, process heating duties existing in the olefins recovery train may be satisfied by condensing one or more HPS, MPS, or LPS stream(s).

We have found that the steam stream(s) at various pressures produced from and/or consumed in an $H_2$-rich fuel gas production plant can be judiciously integrated with the steam stream(s) at various pressures produced from and/or consumed in an olefins production plant to achieve considerably enhanced overall energy efficiency and cost efficiency. Thus, a Super-HPS stream produced in an $H_2$-rich fuel gas production plant (e.g., a stream produced from the WHRU) may be advantageously combined with another Super-HPS stream produced in an olefins production plant (e.g., a stream produced from a steam cracker and/or a boiler) to form a joint stream, which is then supplied to consumers such as turbines, a syngas production unit, and the like, located in the plants. Likewise, HPS streams produced at the plants may be combined and supplied to consumers, so do the MPS streams, and the LPS streams.

The reformed stream exiting the reforming reactor of the $H_2$-rich production plant has a high temperature and high pressure as indicated above in section I. It is highly desirable to capture the heat energy contained therein. Thus, preferably, the reformed stream passes through a waste heat recovery unit ("WHRU") to produce a cooled reformed stream and to generate a high-pressure steam ("HPS") stream. The cooled reformed stream can have a temperature from, e.g., 285° C., 290° C., 300° C., to 310° C., 320° C., 330° C., 340° C., 350° C., to 360° C., 370° C., 380° C., 390° C., or even 400° C. The cooled reformed stream can have a pressure substantially the same as the reformed stream exiting the reforming reactor. The WHRU can include, e.g., one or more heat exchanger and one or more steam drum in fluid communication with the heat exchanger. The steam drum supplies a water stream to the heat exchanger, where it is heated and can be then returned to the steam drum, where steam is separated from liquid phase water. The HPS stream can have an absolute pressure from, e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. In certain embodiments, the HPS stream is preferably a Super-HPS stream. The thus produced HPS stream is a saturated steam stream.

To make the HPS stream more useful, it may be further heated to produce a superheated HPS ("SH-HPS") stream in, e.g., a furnace. In case the syngas producing unit comprises an SMR having a convection section as described above, the saturated HPS stream may be advantageously superheated in the convection section of the SMR and/or in an auxiliary furnace. In case the syngas producing unit comprises one or more ATR but no SMR, the saturated HPS stream can be superheated in an auxiliary furnace. The auxiliary furnace can include one or more burners combusting a fuel gas stream to supply the needed thermal energy as is known to one skilled in the art, preferably a fuel gas stream derived from the $H_2$-rich stream produced in an $H_2$-rich fuel gas production plant and/or the steam cracker $H_2$ stream produced in an olefins production plant as described above. The SH-HPS stream can have one of both of: (i) a temperature from, e.g., 350° C., 360° C., 370° C., 380° C., 390° C., 400° C., to 410° C., 420° C., 430° C., 440° C., 450° C., to 460° C., 470° C., 480° C., 490° C., 500° C., to 510° C., 520° C., 530° C., 540° C., or even 550° C.; and (ii) an absolute pressure from, e.g., e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. Preferably the SH-HPS stream has a temperature of at least 371° C. and the steam feed in step (A) has an absolute pressure of at least 1700 kPa. In certain embodiments, the SH-HPS stream preferably has a pressure higher than that of the steam feed supplied to the syngas producing unit in step (A), so that the SH-HPS can be expanded to produce a steam stream having a pressure in the vicinity of the pressure of the steam feed, which can then be supplied to the syngas producing unit as at least a portion of the steam feed. Preferably the SH-HPS stream has a temperature of at least 482° C. and an absolute pressure of at least 10,000 kPa, and the steam feed has an absolute pressure of at least 1,700 kPa (e.g., at least 2,500 kPa). In a preferred embodiment, the SH-HPS stream may be supplied to an HPS header located in an industrial plant, such as an olefins production plant, and an $H_2$-rich fuel gas production plant, supplying HPS to suitable equipment consuming SH-HPS. In another embodiment, the SH-HPS stream may be also a Super-HPS stream, and supplied to a Super-HPS header located in an industrial plant, such as an olefins production plant, supplying Super-HPS to suitable equipment consuming superheated Super-HPS.

In certain preferred embodiments, at least a portion of an SH-HPS stream derived from a steam stream produced in a $H_2$-rich fuel production plant (e.g., the SH-HPS stream produced at the WHRU) and/or a steam stream produced from an olefins production plant (e.g., an SH-HPS stream produced from a steam cracker and/or a boiler) can be expanded in at least one stage of a steam turbine to produce shaft power and an expanded steam stream having a pressure equal to or higher than that of the steam feed to the syngas producing unit. The expanded steam stream may have a temperature from, e.g., 260° C., 270° C., 280° C., 290° C., 300° C., to 310° C., 320° C., 330° C., 340° C., 350° C., to 360° C., 370° C., 380° C., 390° C., 400° C., or even 405° C. The expanded steam stream has a pressure lower than the SH-HPS stream, which may range from, e.g., 1,380 kPa, 1,400 kPa, 1,500 kPa, 1,600 kPa, 1,700 kPa, 1,800 kPa, 1,900 kPa, 2,000 kPa, to 2,200 kPa, 2,400 kPa, 2,500 kPa, 2,600 kPa, 2,800 kPa, 3,000 kPa, to 3,200 kPa, 3,400 kPa, 3,500 kPa, 3,600 kPa, 3,800 kPa, 4,000 kPa, to 4,200 kPa, 4,400 kPa, or even 4,500 kPa. The expanded steam stream may be an HPS stream, or an MPS stream. The steam turbine may produce multiple exhaust streams in certain embodiments, e.g., an HPS stream and an LPS stream; an HPS stream and a condensable stream supplied to a condenser; an MPS stream and an LPS stream; or an MPS stream and a condensable stream supplied to a condenser.

In certain embodiments, a single stage of steam turbine is used for expanding the SH-HPS stream. In certain other embodiments, multiple cascading stages of steam turbines may be used, where an expanded steam stream produced from an upstream stage, preferably an HPS stream or an MPS stream, is supplied to a downstream steam turbine, expanded therein to produce a lower pressure steam stream and additional shaft power. The shaft power produced by the one or more such steam turbines can be used to perform mechanical work such as: driving a generator to produce electrical power transmissible to local and/or distant electrical equipment; driving a compressor or pump located in an industrial plant, such as a process gas compressor, a propylene refrigeration compressor, an ethylene refrigeration compressor, an air compressor, and/or various pumps located in an olefins production plant. The expanded steam stream may be supplied to a steam header with the suitable pressure rating located in any industrial plant such as an olefins production plant. In certain embodiments, the SH-HPS stream may be supplied to an olefins production plant at a pressure no less than the maximal pressure required for the operation of any steam turbine having a power rating of at least 1 megawatt (1 MW, or ≥5 MW, or ≥10 MW, or ≥20 MW) in the olefins production plant. In certain preferred embodiments, the SH-HPS stream (which may or not be a Super-HPS stream) may be supplied to a first stage steam turbine that drives a process gas compressor in an olefins production plant, and the expanded steam stream from the first stage steam turbine, which may be an SH-HPS stream or an MPS stream, may be supplied to a second stage steam turbine producing a second expanded steam stream and shaft power driving another process gas compressor, a propylene refrigeration compressor, an ethylene refrigeration compressor, an air compressor, and/or a pump in the olefins production plant. In another embodiment, the SH-HPS stream may be supplied to drive one or more process gas compressors, a propylene refrigeration compressor, and an ethylene refrigeration compressor, each producing an expanded steam stream having the same, similar, or different pressure. The expanded steam streams from the first stage and/or the second stage can then be used to provide process heat, or supplied to additional steam turbines, depending on their respective pressures. In addition, one or more of the steam turbines may exhaust a condensable steam stream fed to a condenser to produce a condensate water stream. Preferably, at least one, preferably at least two, preferably all, of the steam turbines driving the PGCs, the propylene refrigeration compressors, and the ethylene refrigeration compressors are back-pressure steam turbines. Back-pressure turbines do not produce a steam stream supplied to a surface condenser, where it is condensed resulting in release of thermal energy to the atmosphere. By using back-pressure turbines, conventional surface condensers used in conventional condensing turbines are eliminated, resulting in reduction of capital and operational costs, as well as release of thermal energy to the atmosphere.

While the shaft power produced in expanding the SH-HPS stream may be used to drive an electricity generator in a power island, in preferred embodiments of this disclosure where the shaft power is used to drive compressors, pumps, and the like in an integrated olefins production plant, such power island can be eliminated or included at a smaller size, resulting in considerable reduction in capital costs and operation costs.

In certain preferred embodiments of the $H_2$-rich fuel gas production process, step (VII) of recovering the at least a portion of the $CO_2$ present in the crude gas mixture stream to produce a $CO_2$ stream and a $H_2$-rich stream is carried out using an amine $CO_2$ capture unit. Step (VII) may preferably comprise: (VIIa) obtaining an exhaust steam stream having an absolute pressure from 200 kPa to 1,050 kPa and shaft power from one or more extraction turbine(s) and/or back-pressure turbine(s) (preferably one or more back-pressure turbine(s)) located in a an olefins production plant; (VIIb) feeding the crude gas mixture stream and a lean-amine stream comprising an amine into an absorption column; (VIIc) obtaining a $CO_2$-rich amine stream and a $CO_2$-depleted residual gas stream from the absorption column; (VIId) feeding at least a portion of the $CO_2$-rich amine stream into a separation column; (VIIe) heating the at least a portion of the $CO_2$-rich amine stream in the separation column using an exhaust steam stream to produce an overhead stream rich in $CO_2$ and a bottoms stream rich in the amine; and (VIII) recycling at least a portion of the bottoms stream to the absorption column as at least a portion of the lean-amine stream.

The extraction turbine(s) and/or back-pressure turbine(s) in step (VIIa) is present in an olefins production plant. Historically these steam turbines located in hydrocarbon processing plants are routinely configured to produce an exhaust steam streams having a very low pressure, e.g., ≤100 kPa, ≤80 kPa, ≤50 kPa, which are then supplied to and condensed at surface condensers with large duty ratings. Such condensing can result in release of significant amount of thermal energy into the atmosphere. In addition, surface condensers having large duty ratings are expensive to buy and operate. Therefore, it would be highly desirable to reduce the size of the surface condensers or eliminate at least some, preferably all, of them without causing problems to the operation of the devices driven by the steam turbines.

The extraction turbine(s) and/or back-pressure turbine(s) in step (VIIa) may receive an HPS feed such as a Super-HPS feed, or an MPS feed, desirably superheated. Depending on the pressure of the steam feed thereto, one or more of the extraction turbine(s) and/or back-pressure turbine(s) may produce, in addition to the exhaust steam stream having an absolute pressure from 200 kPa to 1,050 kPa, one or more of: (i) an HPS stream; (ii) an MPS stream;

and (iii) a condensable stream supplied to a surface condenser. Preferably at least one, preferably all, of the extraction turbine(s) and/or back-pressure turbine(s) is a back-pressure turbine that does not produce (iii) a condensable stream (e.g., a steam stream having an absolute pressure ≤100 kPa) supplied to a surface condenser. The extraction turbine(s) and/or back-pressure turbine(s) can include one or more of: the steam turbines driving the process gas compressors; the steam turbine(s) driving the propylene refrigeration compressor(s); the steam turbine(s) driving the ethylene refrigeration compressor(s); the steam turbine(s) driving various air compressors; the steam turbine(s) driving various pumps; and the steam turbine(s) driving electricity generator(s), and combinations thereof.

The exhaust steam stream having an absolute pressure from 200 kPa to 1,050 kPa may be produced by a single extraction turbine or back-pressure turbine. Alternatively, the exhaust steam stream can be a joint stream of several such exhaust steam streams having similar pressures produced from multiple extraction turbine(s) and/or back-pressure turbines. This pressure range is particularly advantageous for supplying heat needed in the regeneration step of an amine $CO_2$ capture process. Thus, the exhaust steam stream can have an absolute pressure from, e.g., 200 kPa, 250 kPa, 300 kPa, 350 kPa, 400 kPa, 450 kPa, 500 kPa, to 550 kPa, 600 kPa, 650 kPa, 700 kPa, 750 kPa, 800 kPa, to 850 kPa, 900 kPa, 950 kPa, 1,000 kPa, or even 1,050 kPa. Preferably, the exhaust steam stream has an absolute pressure of no greater than 480 kPa.

In step (VIIb), the gas mixture stream and a lean-amine stream comprising an amine are fed into an absorption column. Any amine absorption column and amine known to one skilled in the art of $CO_2$ separation may be used. Non-limiting examples of useful amine include: monoethanolamine ("MEA"), diethanolamine ("DEA"), methyldiethanolamine ("MDEA"), diisopropanolamine ("DIPA"), diglycolamine ("DGA"), and mixtures thereof.

The most commonly used amines for $CO_2$ separation and capture are DEA, MEA, and MDEA. In a preferred embodiment, the lean-amine stream is supplied to the upper section of the absorption column, and the gas mixture is fed into a lower section of the absorption column. Counter-current contacting between the gas mixture and the amine in the absorption column results in producing a $CO_2$-rich amine stream and a $CO_2$-depelted residual gas stream in step (VIIc). Preferably the $CO_2$-rich amine stream exits the absorption column from the bottom and the $CO_2$-depleted residual gas stream from the top.

In step (VIId), at least a portion of the $CO_2$-rich amine stream is fed into a separation column. Any design of the separation column known to one skilled in the art may be used. The separation column is sometimes also called a regeneration column in that the amine is regenerated from this column. In step (VIId), at least a portion of the $CO_2$-rich amine stream is heated in the separation column Such heating can be effected by using a heat exchanger. At least a part, preferably ≥30%, preferably ≥50%, preferably 60%, preferably 80%, preferably ≥90%, preferably the entirety, of the thermal energy used for the heating is provided by the exhaust steam stream produced in step (VIId). Upon being heated to a desirable temperature, the $CO_2$ separates from the amine in the separation column, resulting in a $CO_2$-rich stream and a stream rich in the amine Preferably, the $CO_2$-rich stream exits the separation column at the top, and the stream rich in the amine from the bottom. The stream rich in the amine can be at least partly recycled to the absorption column as at least a portion of the lean-amine stream in step (vii). The $CO_2$-rich stream can be compressed, liquefied, conducted away, stored, sequestered, or utilized in any suitable applications known to one skilled in the art. In one embodiment, the $CO_2$—rich stream, upon optional compression, can be conducted away in a $CO_2$ pipeline. In another embodiment, the $CO_2$—rich stream, upon optional compression and/or liquefaction, can be injected and stored in a geological formation. In yet another embodiment, the $CO_2$—rich stream, upon optional compression and/or liquefaction, can be used in extracting hydrocarbons present in a geological formation. Another exemplary use of the $CO_2$-rich stream is in food applications.

The exhaust steam stream produced from the extraction turbine(s) and/or back-pressure turbine(s) in step (VIIa) having an absolute pressure from 200 kPa to 1,050 kPa (preferably no greater than 800 kPa, preferably no greater than 500 kPa, preferably no greater than 480 kPa) is particularly suitable for supplying heat to the separation column to effect the separation of $CO_2$ from the amine One skilled in the art can extract the suitable quantity of the exhaust steam stream from the one or more extraction turbine(s) and/or back-pressure turbine(s), as illustrated below in this disclosure, to satisfy the heating duty needed in the $CO_2$/amine separation/regeneration column to effect the separation of any given quantity of the crude gas mixture with any $CO_2$ concentration therein. By producing the exhaust steam stream and supplying the same to the separation column, residual thermal energy in the exhaust steam stream is utilized to perform useful work. This is in contrast to the prior art of producing a condensable steam stream further condensed in a surface condenser, where residual thermal energy in the condensable stream is released to the atmosphere and lost. When an olefins production plant including multiple large steam turbines is steam-integrated with an amine $CO_2$-separation process according to the various embodiments of this disclosure, substantial improvement in energy efficiency can be achieved, as demonstrated by the Examples in this disclosure below. Moreover, extraction of such exhaust steam stream(s) can be carried out in one or more back-pressure turbines, such that each turbine can still produce sufficient amount of shaft power for driving the target equipment. In certain embodiments, it may be desirable to increase steam feed to one or more of the extraction turbine(s) and/or back-pressure turbines to ensure the production of both sufficient amount of shaft power and the exhaust steam stream. To that end, in certain specific embodiments, one may replace an existing steam turbine with an electric motor, so that the steam required by the replaced steam turbine can be supplied to an extraction turbine and/or a back-pressure turbine producing the exhaust steam stream and the shaft power in sufficient amount. In certain embodiments, the exhaust steam stream is produced from a back-pressure turbine, and the exhaust stream provides a quantity of energy to the at least a portion of the CO2-rich amine stream in step (VIIe); and at least 30% (preferably ≥50%, preferably ≥60%, preferably ≥70%) of the quantity of energy would have been lost to the atmosphere in a comparative process identical with the process except the back-pressure turbine is substituted by an extraction/condensing turbine with the identical power rating.

This disclosure is further illustrated by the exemplary but non-limiting embodiments shown in the drawings, which are described below. In the drawings, the same reference numeral may have similar meanings. In the drawings illustrating an inventive process/system, where multiple initially separate streams are shown to form a joint stream supplied to a next step or device, it should be understood to further include, where appropriate, an alternative where at least one of such multiple separate streams is supplied to the next step or device separately. Where multiple initially separate streams having similar compositions and/or use applications (e.g., the $H_2$-rich stream and the steam cracker $H_2$ stream) are shown to form a joint stream supplied to multiple next steps or devices, it should be understood to include, where appropriate, alternatives where at least one of the separate streams and the joint stream is supplied to at least one of the multiple next steps or devices. Thus, where a fuel gas (e.g., an $H_2$-rich stream) X and a fuel gas stream (e.g., a steam cracker $H_2$ stream) Y, initially separate and generated from differing devices but with similar fuel gas applications, are shown to form a joint stream Z supplied to two separate furnaces A and B, it should be understood to include alternatives where at least one of X, Y, and Z is supplied to at least one of A and B, including but not limited to the following: (i) only stream Z is supplied to A and B; (ii) both of X and Y are supplied, separately, to at least one of A and B; (iii) both of X and Z are supplied, separately, to at least one of A and B; (iv) both of Y and Z are supplied, separately, to at least one of A and B; and (v) only one of X and Y is supplied to at least one of A and B. The drawings are only for the purpose of illustrating certain embodiments of this disclosure, and one skilled in the art appreciates that alternatives thereof may fall within the scope of this disclosure.

FIG. 1 (Comparative)

FIG. 1 schematically illustrates a steam supply/consumption system 101 of a conventional olefins production plant including one or more steam cracker furnaces. One or more Super-HPS stream(s)) 107 are produced from one or more steam cracker furnace(s) 103. One or more Super-HPS stream(s) 109 are produced from one or more auxiliary steam boiler(s) or COGEN units 105. Streams 107 and 109 may be optionally combined, as shown, at a Super-HPS header, from which the Super-HPS stream can be distributed to equipment consuming steam. As shown in FIG. 1, one or more Super-HPS stream(s) 113, one or more Super-HPS stream(s) 115, and one or more Super-HPS stream(s) 117 are supplied to one or more steam turbine(s) 119, one or more steam turbine(s) 129, and one or more steam turbine(s) 141, respectively. Steam turbine(s) 119 can drive one or more process gas compressor(s). Steam turbine(s) 129 can drive one or more propylene refrigeration compressors. Steam turbine(s) 141 can drive one or more ethylene refrigeration compressors. Additional Super-HPS steam may be supplied to other facilities/equipment/process 111 for consumption. From steam turbine(s) 119, one or more HPS stream(s) 121 may be exhausted. Stream(s) 121 can be used to provide process heat, e.g., to a stream 125 in the olefins production plant or other facilities, or supplied to a steam turbine 125 receiving an HPS stream and exhausting a MPS stream, or supplied to a steam turbine 125 receiving an HPS stream and exhausting an LPS stream, to produce additional mechanical work which can be used to drive another process gas compressor, pumps, and the like. From steam turbine(s) 119, one or more condensable stream(s) 123 are typically exhausted, which are condensed at condenser(s) 127 to produced one or more condensed water stream(s) 128. From steam turbine(s) 129, one or more MPS stream(s) 131 may be exhausted. Stream(s) 131 can be used to provide process heat, e.g., to a stream 133 in the olefins production plant or other facilities, or supplied to a steam turbine 133 receiving a MPS stream and exhausting an LPS stream, to produce additional mechanical work which can be used to drive another compressor, pumps, and the like. From steam turbine(s) 129, one or more condensable stream(s) 135 are exhausted, which are then condensed at condenser(s) 137 to produce one or more condensed water stream(s) 139. From steam turbine(s) 141, one or more LPS stream(s) 143 may be exhausted. Stream(s) 143 can be used to provide process heat, e.g., to a stream 145 in the olefins production plant or other facilities. From steam turbine(s) 141, one or more condensable stream(s) 147 are exhausted, which are then condensed at condenser(s) 149 to produce one or more condensed water stream(s) 151. Condensed water streams 128, 139, and 151 are then combined and processed together at location 353. The production of condensable steam streams 123, 135, and 147, which are subsequently condensed using surface condensers, can increase the shaft power production of turbines 119, 129, and 141. However, the condensing of them result in release of substantial quantity of thermal energy released to the atmosphere. In addition, the surface condensers 127, 137, and 149 require substantial capital investment and operational costs.

Figure 2:
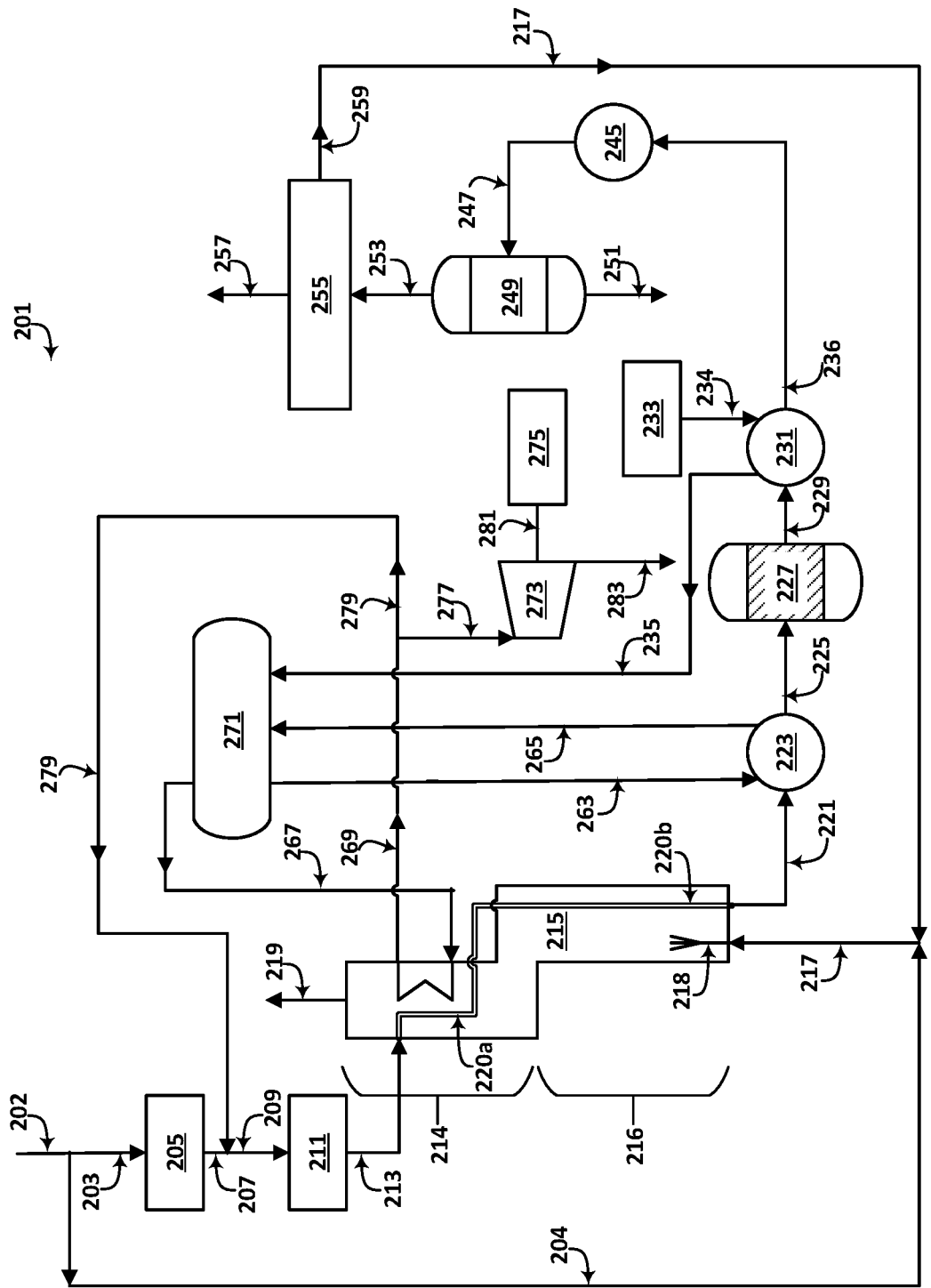
FIG. 2 schematically illustrates a comparative $H_2$ production process/plant including an SMR.

FIG. 2 (Comparative)

FIG. 2 schematically illustrates a comparative $H_2$ production plant including an SMR. As shown, a natural gas feed stream 202, which may contain $CH_4$, C2+ hydrocarbons at various concentrations, and sulfur-containing compounds at various concentrations, is split into steams 203 and 204. Stream 203 is first fed into a sulfur removal unit 205 to produce a sulfur-abated stream 207. Stream 207 is combined with a steam stream 279 to form a hydrocarbon/steam mixture stream 209. Stream 209 is then fed into a pre-reformer 211 containing a pre-reforming catalyst therein. On contacting the pre-reforming catalyst, the heavier C2+ hydrocarbons are preferentially converted into methane (thus preventing the formation of coke in the downstream primary reforming reactor) to produce a pre-reforming effluent 213 comprising methane and steam. Stream 213 is then fed into a tube 220a in the upper section 214, sometimes called convection section, of an SMR 215, where it is heated. SMR 215 comprises a lower section 216, sometimes called radiant section, housing one or more tube 220b which is in fluid communication with tube 220a receiving the stream 213 heated in tube 220a. As shown, in certain embodiments, a tube 220a may exit the convection section to the exterior of the SMR furnace, and then connect with tube(s) 220b, which re-enter the SMR furnace. Multiple tubes 220b may be connected with one tube 220a via one or more manifold (not shown) outside of the SMR furnace housing, though one tube 220b is shown. SMR 215 comprises one or more burners 218 in the radiant section 216, where a SMR fuel combusts to supply energy to the radiant section 216 and then the convection section 214 of SMR 215.

A reforming catalyst is loaded in tube(s) 220b in the radiant section 216. Due to the proximity to the burner(s) 218, the $CH_4$ and steam mixture, and the reforming catalyst in tube(s) 220b are heated/maintained at an elevated temperature. The forward reaction of the following preferentially occurs:

(R-1)

In addition, various amounts of $CO_2$ may be produced in tube(s) 220b. Thus, a reformed stream 221 comprising CO, $H_2$, residual $CH_4$, residual $H_2O$ and optionally various amount of $CO_2$ exits the outlet of tube(s) 220b from the SMR. Stream 221 is then cooled at a waste heat recovery unit ("WHRU") including a waste heat boiler ("WHB") 223 and a steam drum 271 to produce a cooled reformed stream 225 and to generate an HPS stream 267. As shown, a water stream 263 flows from steam drum 271 to WHB 223, and a steam-water mixture stream 265 flows from WHB 223 to steam drum 271.

Stream 267, a saturated steam stream, is then heated in the convection section 214 of SMR 215 to produce a superheated, high-pressure steam ("SP-HP") steam stream 269. A split stream 279 of stream 269 is combined with the sulfur-abated hydrocarbon feed stream 207 to form a combined stream 209, which is then fed into the pre-reformer 211 as described above. Another split stream 277 of stream 269 is fed into a steam turbine 173, where it is expanded to produce an exhaust steam stream 283 and shaft power driving an electricity generator via shaft 281. Exhaust steam stream 283 may be condensable and condensed using a surface condenser.

As shown in FIG. 2, the cooled reformed stream 225, comprising CO, $H_2$, $H_2O$, and optionally $CO_2$, is then fed into a shift reactor 227 containing a shift catalyst loaded therein. On contacting the shift catalyst under the shifting conditions, the forward reaction of the following preferentially occurs:

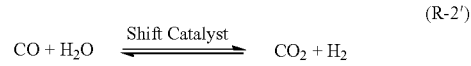

(R-2')

Thus, a shifted stream 229 comprising CO at a lower concentration than stream 225 and $CO_2$ at a higher concentration than stream 225 exits the shift reactor 227.

The shifted stream 229 is then cooled down at heat exchanger 231 by a boiler feed water stream 234, supplied from a boiler feed water treatment unit 233. The thus heated boiler feed water stream 235 exiting the heat exchanger 231 is then supplied to steam drum 271 and at least partly supplied to the WHB 223, to produce high-pressure steam stream 267 as described earlier.

The cooled shifted stream 236 exiting heat exchanger 231, comprising CO, $H_2$, $H_2O$, and $CO_2$, is then further cooled down at heat exchanger 245. A portion of the residual steam in stream 236 is condensed to liquid water in stream 247, which can be fed into a separator 249 to obtain a condensate stream 251 and a vapor stream 253. The steam-abated stream 253 comprises primarily $H_2$ and $CO_2$, $CH_4$ and CO.

Stream 253 is then supplied into a pressure-swing ("PSA") unit 255 to produce an $H_2$ stream 257 and a PSA reject stream 259 comprising CO, $CO_2$, $CH_4$, and $H_2$, is then fed into SMR 215, along with a split natural gas stream 204, as SMR fuel, which is combusted at burner(s) 218 to provide the thermal energy needed for the radiant section and convention section of SMR 215. The PSA reject stream 215 typically comprises $H_2$ no greater than 30 vol %, based on the total volume of stream 215.

In the $H_2$ production process 201 of FIG. 2, due to the combustion of natural gas from stream 204 and the carbon-rich PSA reject stream 259, the flue gas stream 219 exiting SMR 215 comprises $CO_2$ at considerably high concentration. While it is possible to capture the $CO_2$ from stream 219 to reduce $CO_2$ emission from process 201 by using an amine absorption/regeneration unit, such unit requires high capital expense, and because stream 219 is at atmospheric pressure, high operational expense as well. The PSA unit 255 also requires significant capital and operational expense.

FIG. 3

Figure 3:
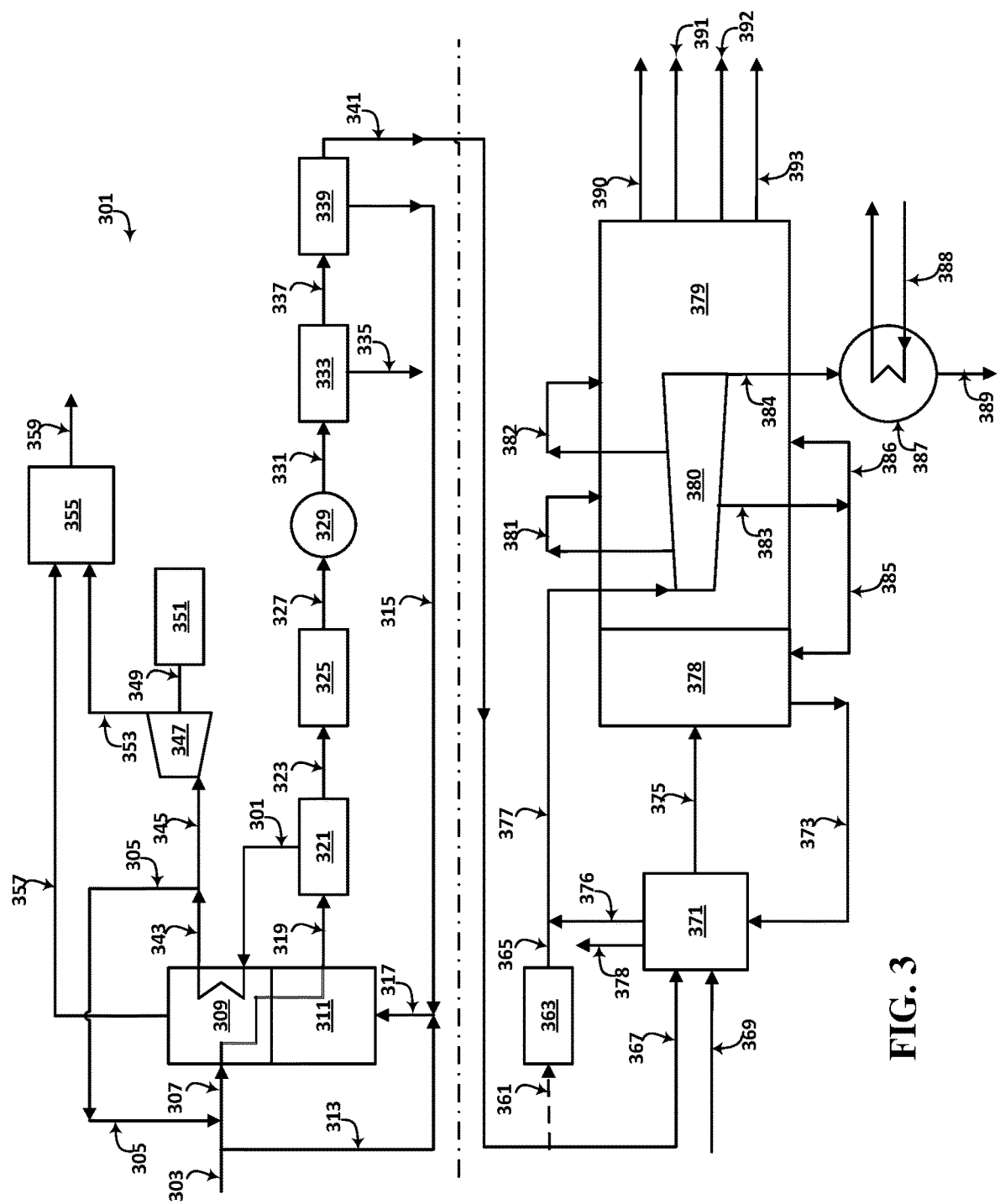
FIG. 3 schematically illustrates a comparative process including the comparative $H_2$ production plant of FIG. 2 supplying $H_2$ fuel gas to an olefins production plant.

FIG. 3 schematically illustrates a comparative process/system 301 where $H_2$ is supplied from a $H_2$ production process similar to that of FIG. 2 to an olefins production plant including one or more steam cracker furnaces. As shown, a split stream of natural gas stream 303 is combined with a steam stream 305 to form a joint stream 307, which is fed into a tube located in the convection section 309 of an SMR and heated therein, and then enters a tube containing a reforming catalyst in the radiant section 311 of the SMR. The SMR receives a SMR fuel gas stream 317, which combusts in the SMR to generate the thermal energy heating the radiant section 311 and the convection section 309. On contacting the reforming catalyst, the $CH_4$/steam mixture undergoes reforming reaction to produce a reformed gas stream 319 comprising CO, $CO_2$, $H_2$, and $CH_4$ exiting the SMR. Stream 319 is then cooled down at waste-heat recovery unit 321 to obtain a cooled reformed stream 323 and an HPS stream 301. Stream 301 is then heated in the convection section of the SMR to obtain a SH-HPS stream 343. A split steam 305 of stream 343 is combined with natural gas feed stream to form the mixture stream 307 fed into the SMR, as discussed above. Another split stream 345 of stream 343 is then fed into steam turbine 347, where it is expanded to produce shaft power driving an electricity generator 351 via shaft 349. The exhaust steam stream 353 from turbine 347, a LPS stream, can be sent to an amine regenerator of a $CO_2$ capture unit 355, as described below.

The cooled reformed stream 323 is then fed into a shift reactor 325, where it contacts a shift catalyst to effect the conversion of a quantity of $CO/H_2O$ into $CO_2$ and $H_2$ to produce a shifted stream 327 exiting the shift reactor 325. Stream 327 is then cooled down at heat exchanger 239 to produce a cooled shifted stream 331 containing condensed water. In water separator 333, a condensed water stream 335 is separated from stream 331 to produce a steam-abated stream 337 comprising primarily $H_2$, $CO_2$, and CO. Stream 337 is then fed into a PSA unit 339 to produce a $H_2$ stream 341 and a PSA reject stream 315. Stream 315, comprising CO, $CO_2$, and $H_2$, is combined with natural gas stream 313 to form a SMR fuel gas stream 317. Stream 317 is combusted in the SMR to generate the thermal energy heating the radiant section 311 and the convection section 309 as described above. Flue gas stream 357 exiting the SMR contains considerable quantity of $CO_2$. To reduce $CO_2$ footprint of the $H_2$ production plant, stream 357 is fed into the amine $CO_2$ capture unit 355 as described above. In unit 355, an amine regenerator is heated by steam stream 353 to effect the separation of a $CO_2$ stream 359 exiting unit 355. $CO_2$ stream 359 can be transferred via a pipeline, stored, sequestered, or utilized.

As shown in FIG. 3, the $H_2$ stream 341, or a portion thereof, is then supplied to a steam cracker 371 located in an olefins production plant as stream 367 as a steam cracker fuel, where it combusts to provide the thermal energy needed for the cracking and heating of a steam cracker feed and to generate a flue gas stream 378 exiting the steam cracker 371. If the $H_2$ stream 367 comprises high-purity $H_2$ (e.g., with a $H_2$ concentration $\geq$ 99 mol %), then the flue gas stream 378 may be substantially free of $CO_2$. A steam cracker hydrocarbon feed stream 369 and a dilution steam stream enter steam cracker 371, heated in a convection section thereof, and then enter into a radiant section where cracking occurs at high temperature for a short residence time to produce a steam cracker effluent comprising $H_2$, C1-C4 hydrocarbons comprising the desirable C2-C4 olefins, and C5+ hydrocarbons, among others. The steam cracker effluent is immediately cooled down via quenching and/or indirect heat exchange in steam cracker 371, producing a quenched steam cracker effluent stream 375 and a substantial quantity of HPS which is then superheated to produce an SH-HPS stream 376. The quenched steam cracker effluent stream 375 is sent to the hot-ends 378 of the recovery section where it is further cooled. In section 378 a dilution steam 373 is generated which is sent to steam cracker 371. Optionally, a split stream 361 of $H_2$ stream 341 may be supplied to one or more boilers 363 to produce additional amount of SH-HPS in stream 365. Streams 365 and 376 are combined to form stream 377. Separation of the cooled steam cracker effluent stream 375 produces a process gas stream comprising $H_2$ and C1-C4 hydrocarbons including the desired C2-C4 olefins. The process gas stream is compressed in compressor(s) 380 to an elevated pressure, supplied to the cold end 379 of the recovery section to produce, among others, a tailgas stream 390 consisting essentially of $CH_4$ and $H_2$; an ethylene product stream 391; a propylene product stream 392; and one or more C4+ co-product streams 393, among others.

The SH-HPS stream 377 is supplied to one or more steam turbine(s) driving one or more process gas and/or refrigeration compressors 380. An HPS stream 381 may be produced from one or more turbines and fed to another turbine, or used to provide a process heating duty. An MPS stream 383 may be produced from one or more turbines, split into a stream 386 which is fed to another turbine or used to provide a process heating duty, and a stream 385 which is fed to the hot end 378 of the recovery section to generate dilution steam. An LPS stream 382 may be produced from one or more turbines and used to provide a process heating duty. The turbines may exhaust one or more condensable streams 384, which is supplied to one or more surface condensers 387, where it is cooled by a cooling water stream 388 to produce a condensate stream 389.

In the process 301, $CO_2$ emissions from steam cracker(s) 371 is reduced by combusting $H_2$ from the $H_2$ stream 367 compared to conventional steam cracker(s) combusting natural gas, or methane-rich tail-gas, or a combination of natural-gas and methane-rich tail-gas; $CO_2$ emissions from boiler(s) 363 can be reduced if $H_2$ stream 361 supplies the fuel gas thereto compared to conventional boilers combusting natural gas or a mixture of natural-gas and methane-rich tail-gas; and $CO_2$ emission is reduced by capturing $CO_2$ stream 359 from the SMR flue gas stream 357 using the amine absorption/regeneration unit 355 compared to a conventional $H_2$ production plant using an SMR combusting natural gas without capturing $CO_2$ from the SMR flue gas. Nonetheless, the process 301 has the following drawbacks: a high capital cost due to the many equipment required; substantial cost of operating the amine $CO_2$ capture unit 355 due to the large volume of flue gas 357 at atmospheric pressure; and the loss of thermal energy to the atmosphere due to the use of surface condenser(s) 387.

FIG. 4

Figure 4:
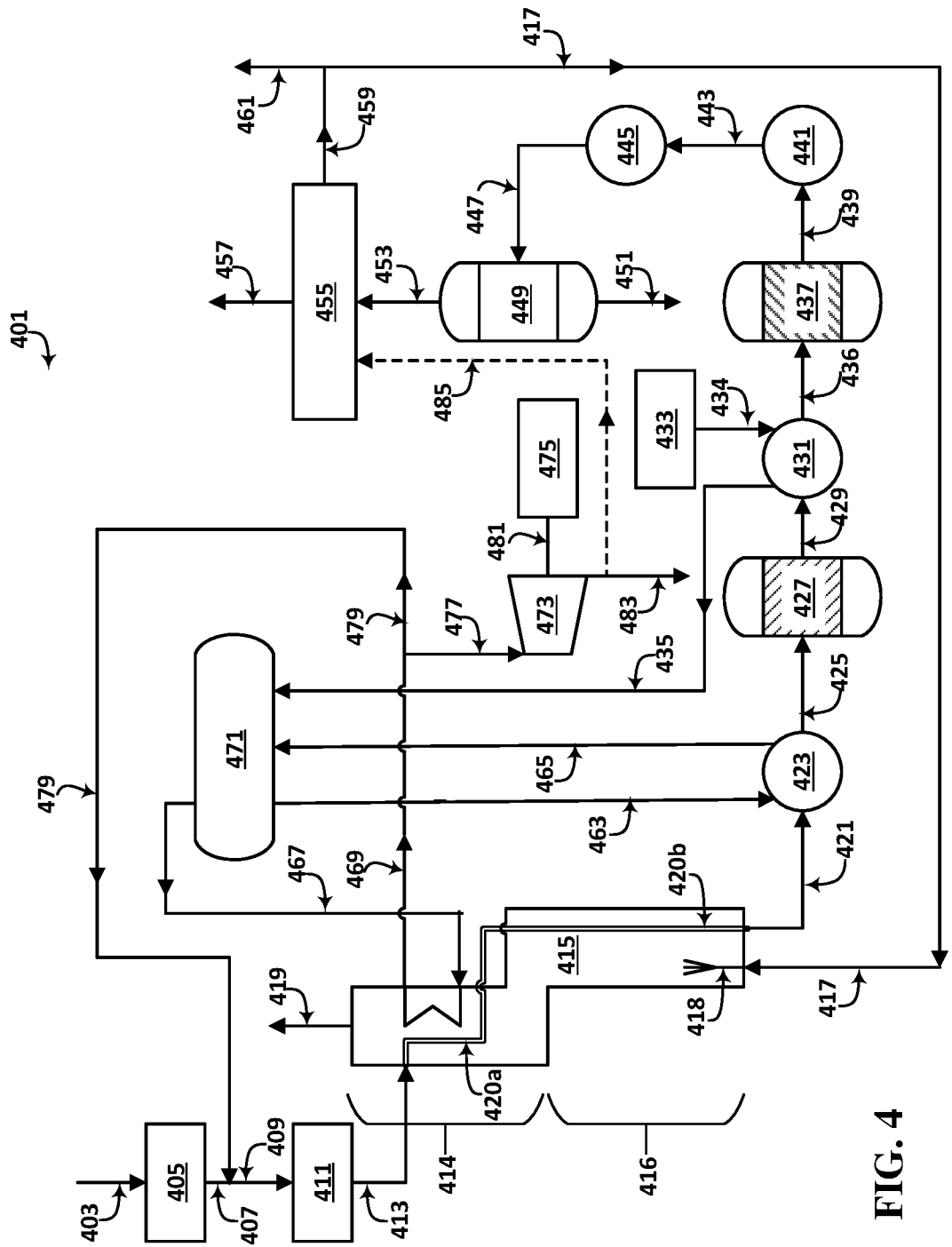
FIG. 4 schematically illustrates an exemplary $H_2$-rich fuel gas production process/plant of this disclosure.

FIG. 4 schematically illustrates an exemplary $H_2$-rich fuel gas production process/plant 401 of this disclosure according to certain preferred embodiments. As shown, a hydrocarbon feed stream 403 (e.g., a natural gas stream comprising primarily $CH_4$), which may contain $CH_4$, C2+ hydrocarbons at various concentrations, and sulfur-containing compounds at various concentrations, is first fed into an optional sulfur removal unit 405 to produce a sulfur-abated stream 407, to prevent poisoning catalysts used in the downstream process steps such as the catalyst used in the SMR unit described below. Upon optional preheating via, e.g., a heat exchanger or a furnace (not shown), stream 407 is combined with an HPS stream 479 to form a hydrocarbon/steam mixture stream 409. Upon optional preheating via, e.g., a heat exchanger or a furnace (not shown), stream 409 can be then fed into a pre-reformer 411 which can be an adiabatic reactor containing a pre-reforming catalyst therein. On contacting the pre-reforming catalyst, the heavier C2+ hydrocarbons are preferentially converted into methane (thus preventing the formation of coke in the downstream primary reforming reactor) to produce a pre-reforming effluent 413 comprising methane and steam. Stream 413 is then fed into a tube 420a in the upper section 414, sometimes called convection section, of an SMR 415, where it is heated. SMR 415 comprises a radiant section 416, housing one or more tube 420b which is in fluid communication with tube 420a receiving the stream 413 heated in tube 420a. As shown in FIG. 4, in certain embodiments, a tube 420a may exit the convection section to the exterior of the SMR furnace, and then connect with tube(s) 420b, which re-enter the SMR furnace. Multiple tubes 420b may be connected with one tube 420a via one or more manifold (not shown) outside of the SMR furnace housing, though one tube 420b is shown. SMR 415 comprises one or more burners 418 in the radiant section 416, where a SMR fuel combusts to supply energy to the radiant section 416 and then the convection section 414 of SMR 415. For the convenience of illustration, tubes 420a and 420b in the SMR are shown as comprising multiple straight segments. In practice, certain portions of tubes 420a and 420b, particularly tube 420a, may be curved, or even form serpentine windings.

A reforming catalyst is loaded in tube(s) 420b in the radiant section 416. Due to the proximity to the burner(s) 418, the hydrocarbon feed and steam, and the reforming catalyst in tube(s) 420b are heated/maintained at an elevated temperature. The forward reaction of the following preferentially occurs under syngas producing conditions:

(R-1)

$$CH_4 + H_2O \xrightleftharpoons{\text{Reforming Catalyst}} CO + 3 H_2$$

In addition, various amounts of $CO_2$ may be produced in tube(s) 420b. Thus, a reformed stream 421 comprising CO, $H_2$, residual $CH_4$, residual $H_2O$ and optionally various amount of $CO_2$ exits the outlet of tube(s) 420b from the SMR at a temperature of, e.g., from 750° C. to 900° C. and an absolute pressure of, e.g., from 700 kPa to 3,500 kPa. Stream 421 is then cooled at a waste heat recovery unit ("WHRU") including a waste heat boiler ("WHB") 423 and a steam drum 471 to produce a cooled reformed stream 425 and to generate an HPS stream 467. As shown, a water stream 463 flows from steam drum 471 to WHB 423, and a steam-water mixture stream 465 flows from WHB 423 to steam drum 471.

Stream 467, a saturated steam stream, can be then heated in the convection section 414 of SMR 415 to produce a super-heated, high-pressure steam ("SH-HP") steam stream 469, which can be fed into a steam header and supplied to any suitable equipment or process step. For example, as shown and described above, a split stream 479 of stream 469 can be combined with the sulfur-abated hydrocarbon feed stream 407 to form a combined stream 409, which is then fed into the pre-reformer 441. For another example, a split stream 477 of stream 469 can be fed into a steam turbine 473, where it is expanded to produce an exhaust steam stream 483 and shaft power. The shaft power can be transferred, via shaft 481, to any suitable equipment 475 to produce useful mechanical work. One example of equipment 475 is an electricity generator, which converts the mechanical work into electrical energy transmissible to any suitable local or distant electrical equipment. Exhaust steam stream 483 can have various residual pressure and temperature suitable for, e.g., driving additional steam turbines, heating other equipment and/or streams, and the like. In a specific case the exhaust steam stream 485 may be an LPS stream used to provide heat to the amine regenerator in a $CO_2$ capture unit.

As shown in FIG. 4, the cooled reformed stream 425, comprising CO, $H_2$, $H_2O$, and optionally $CO_2$, is then fed into a first shift reactor 427. The first shift reactor can be operated under a first set of shifting conditions comprising the presence of a first shift catalyst loaded therein. Due to the relatively high temperature in the first set of shifting conditions, the first shift reactor 427 is sometimes called a high-temperature shift reactor. On contacting the first shift catalyst under the first set of shifting conditions, the forward reaction of the following preferentially occurs:

(R-2)

$$CO + H_2O \xrightleftharpoons{\text{First Shift Catalyst}} CO_2 + H_2$$

Thus, a first shifted stream 429 comprising CO at a lower concentration than stream 425 and $CO_2$ at a higher concentration than stream 425 exits the first shift reactor 427. Because the forward reaction above is exothermic, stream 429 has a higher temperature than stream 425 assuming the first shift reactor 427 is an adiabatic reactor.

The first shifted stream 429 can then be further cooled down at heat exchanger 431 by any suitable stream having a temperature lower than stream 429. As shown in FIG. 4, in a preferred embodiment, a boiler feed water stream 434, supplied from a boiler feed water treatment unit 433, is used to cool down stream 429. The thus heated boiler feed water stream 435 exiting the heat exchanger 431 can be supplied to steam drum 471 and at least partly supplied to the WHB 423, to produce high-pressure steam stream 467 as described earlier, or to any other suitable steam generator. Alternatively or additionally (not shown), the hydrocarbon feed stream 403, or a portion thereof, may be heated by stream 429 at heat exchanger 431 or another heat exchanger upstream or downstream of heat exchanger 431.

The cooled first shifted stream 436 exiting heat exchanger 431, comprising CO, $H_2$, $H_2O$, and $CO_2$, is then fed into a second shift reactor 437. The second shift reactor can be operated under a second set of shifting conditions comprising the presence of a second shift catalyst loaded therein and a temperature lower than in the first shift reactor 427. Due to the lower temperature, the second shift reactor 437 is sometimes called a low-temperature shift reactor. On contacting the second shift catalyst under the second set of shifting conditions, the forward reaction of the following preferentially occurs:

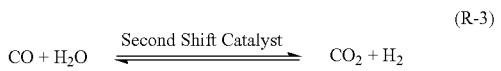

$$CO + H_2O \xrightleftharpoons{\text{Second Shift Catalyst}} CO_2 + H_2 \quad \text{(R-3)}$$

Thus, a second shifted stream 439 comprising CO at a lower concentration than stream 436 and $CO_2$ at a higher concentration than stream 436 exits the second shift reactor 437. Because the forward reaction above is exothermic, stream 439 has a higher temperature than stream 436 assuming the second shift reactor 437 is an adiabatic reactor.

The second shifted stream 439 can then be further cooled down at heat exchanger 441 by any suitable stream having a temperature lower than stream 439. In a preferred embodiment, a boiler feed water stream (not shown) supplied from a boiler feed water treatment unit (e.g., unit 433) can be advantageously used to cool down stream 439. The thus heated boiler feed water stream exiting the heat exchanger 441 can be supplied (not shown) to steam drum 471 and at least partly supplied to the WHB 423, to produce high-pressure steam stream 467 as described earlier, or to any other suitable steam generator. Alternatively or additionally (not shown), the hydrocarbon feed stream 403, or a portion thereof, may be heated by stream 439 at heat exchanger 441 or another heat exchanger upstream or downstream of heat exchanger 441.

The cooled stream 443 exiting heat exchanger 441 can be further cooled at heat exchanger 445 by any suitable cooling medium having a lower temperature than stream 443, e.g., a cooling water stream, ambient air (using an air-fin cooler, e.g.), and the like. Preferably, a portion of the residual steam in stream 443 is condensed to liquid water in stream 447, which can be fed into a separator 449 to obtain a condensate stream 451 and a vapor stream 453. The steam-abated stream 453, a crude gas mixture, comprises primarily $H_2$ and $CO_2$, and optionally minor amount of residual $CH_4$ and CO.

Stream 453 can then be supplied into a $CO_2$ recovery unit 455 to produce a $CO_2$ stream 457 and an $H_2$-rich stream 459. Any suitable $CO_2$ recovery unit known in the art may be used. A preferred $CO_2$ recovery unit is an amine absorption and regeneration unit, where the crude gas mixture stream 453 contacts a counter-current stream of amine which absorbs the $CO_2$, which is subsequently released from the amine upon heating ("regeneration"). The $CO_2$ stream 457 can be supplied to a $CO_2$ pipeline and conducted away. The $CO_2$ stream 457 can be compressed, liquefied, stored, sequestered, or utilized in manners known to one skilled in the art.

The $H_2$-rich stream 459 can advantageously comprise $H_2$ at a molar concentration from, e.g., 80%, 81%, 82%, 83%, 84%, 85%, to 86%, 87%, 88%, 89%, 90%, to 91%, 92%, 93%, 94%, 95%, to 96%, 97%, 98%, 99%, based on the total moles of molecules in stream 459. In addition to $H_2$, stream 459 may comprise: (i) $CH_4$ at a molar concentration thereof based on the total moles of molecules in stream 459, from, e.g., 0.1%, 0.3%, 0.5%, 0.8%, to 1%, 2%, 3%, 4%, or 5%; (ii) CO at a molar concentration thereof based on the total moles of molecules in stream 459, from, e.g., 0.1%, 0.3%, 0.5%, 0.8%, to 1%, 2%, or 3%; and (iii) $CO_2$ at a molar concentration thereof based on the total moles of molecules in stream 459, from, e.g., 0.1%, 0.2%, 0.3%, 0.4%, 0.5%, to 0.6%, 0.7%, 0.8%, 0.9%, or 1%. Stream 459 can be advantageously used as a fuel gas for residential, office, and/or industrial heating. Due to the high concentration of $H_2$ and low concentration of carbon-containing molecules therein, the combustion of stream 459 in the presence of an oxidant such as air, oxygen, and the like, can produce a flue gas stream comprising $CO_2$ at a low concentration. In certain embodiments, the flue gas stream can comprises $CO_2$ at a molar concentration based on the total moles of $H_2O$ and $CO_2$ in the flue gas stream of no greater than 20% (e.g., from 0.1%, 0.2%, 0.4%, 0.5%, to 0.6%, 0.8%, 1%, to 2%, 4%, 5%, to 6%, 8%, 10%, to 12%, 14%, 15%, to 16%, 18 mol %, or 20%). The flue gas stream can be advantageously exhausted into the atmosphere without the need to separate and capture $CO_2$ therefrom.

In a preferred embodiment, as shown in FIG. 4, a split stream 417 of stream 459 can be supplied to the SMR 415, where it is combusted in burner(s) 418 to supply thermal energy to the SMR 415 heating the lower radiant section 416 and tube(s) 420b therein and the convection section 414 and tube 420a therein. Compared to the $H_2$ production plant shown in FIG. 2, the flue gas stream 419 exiting the SMR 415 comprises $CO_2$ at a considerably lower concentration, and therefore can be exhausted into the atmosphere with considerably reduced $CO_2$ emission without the need to separate and capture $CO_2$ therefrom.

FIG. 5

Figure 5:
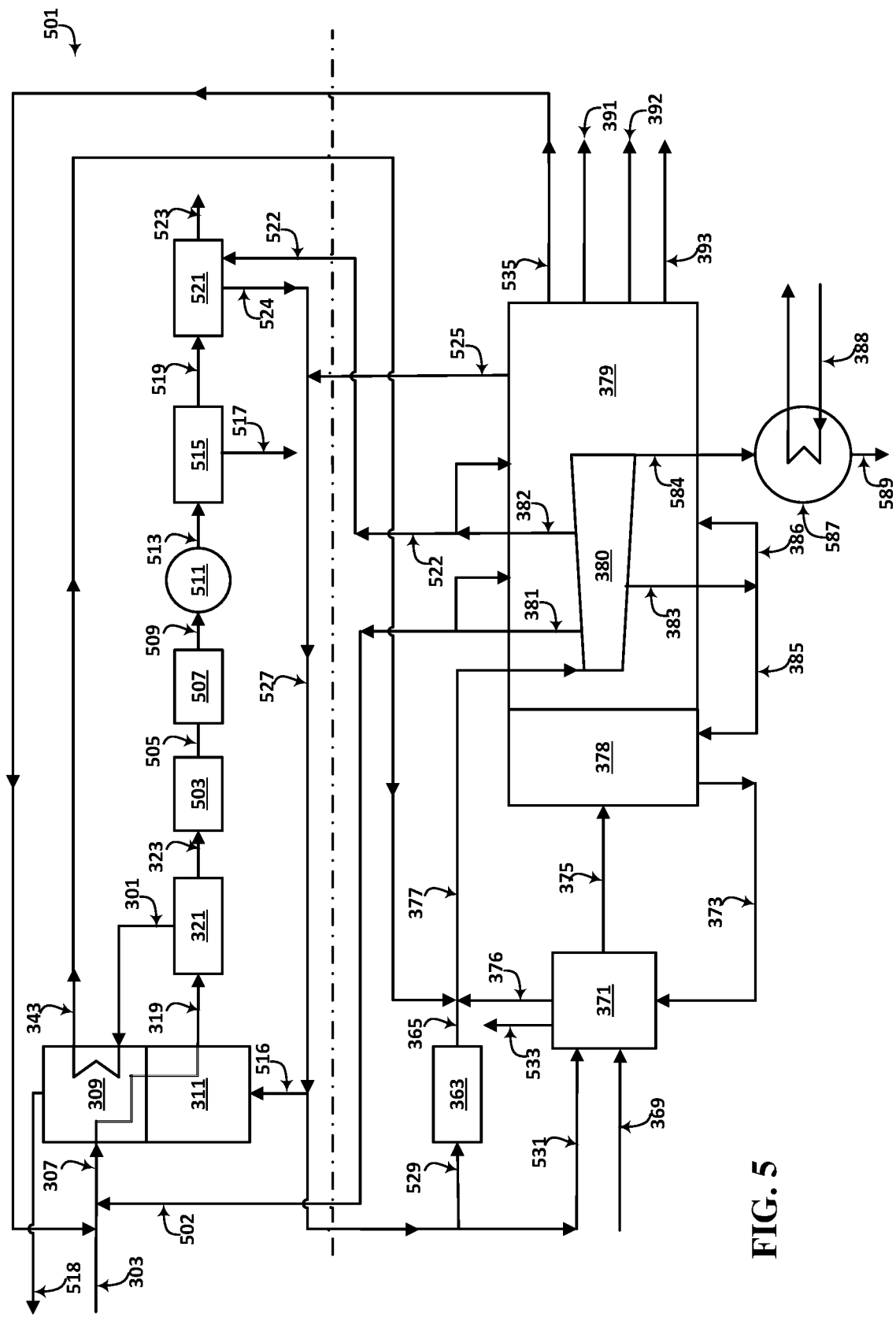
FIG. 5 schematically illustrates an inventive process/system of this disclosure integrating a $H_2$-rich fuel gas production process/plant with an olefins production plant.

FIG. 5 schematically illustrates an inventive process/system 501 of this disclosure integrating a $H_2$-rich fuel gas production process/plant with an olefins production plant comprising a steam cracker. As shown, a natural gas stream 303 is combined with a $CH_4$-rich stream 535 produced from the recovery section of an olefins production plant and an HPS stream 502 produced from a steam turbine (preferably a steam turbine driving a process gas or refrigeration compressor) 380 in the olefins production plant to form a joint stream 307, which is fed into a tube located in the convection section 309 of an SMR and heated therein, and then enters a tube containing a reforming catalyst in the radiant section 311 of the SMR. The SMR receives a SMR fuel gas stream 516 (a $H_2$-rich fuel gas stream as described below), which combusts in the SMR to generate the thermal energy heating the radiant section 311 and the convection section 309. On contacting the reforming catalyst, the $CH_4$/steam mixture undergoes reforming reaction to produce a reformed gas stream 319 comprising CO, $CO_2$, $H_2$, and $CH_4$ exiting the SMR. Stream 319 is then cooled down at waste-heat recovery unit 321 to obtain a cooled reformed stream 323 and an HPS stream (preferably a Super-HPS stream) 301. Stream 301 is then heated in the convection section of the SMR to obtain a superheated HPS ("SH-HPS") (preferably a superheated Super-HPS) stream 343. Preferably stream 343 has a pressure higher than the steam feed 502 to the SMR. As such, stream 343 or a split stream is not directly fed into the SMR, in contrast to the process of FIG. 3. Stream 343 is then supplied into the olefins production plant, join other HPS stream(s) (preferably Super-HPS stream(s)) produced in the olefins production plant such as stream(s) 375 produced from steam cracker(s) 371 and stream(s) 365 produced from boiler(s) 363, to supply equipment, particular steam turbine(s) in the olefins production plant consuming such HPS, as described below.

The cooled reformed stream 323 is then fed into a first, high-temperature shift reactor 503, where it contacts a first shift catalyst to effect the conversion of a quantity of $CO/H_2O$ into $CO_2$ and $H_2$ to produce a first shifted stream 505 exiting the first shift reactor 503. Stream 505 is then cooled down at heat exchanger(s) (now shown) before entering a second, low-temperature shift reactor 507 to produce a second shifted stream 509. Stream 509 is then cooled down at heat exchanger(s) 511 to produce a cooled second shifted stream 513 containing condensed water. In water separator 515, a condensed water stream 517 is separated from stream 513 to produce a steam-abated stream 519 comprising primarily $H_2$, $CO_2$, and minor amounts of CO and $CH_4$. Stream 519, preferably at a pressure similar to streams 509 and 513 (higher than 200 kPa, preferably at least 700 kPa, preferably at least 1,000 kPa), is then fed into an amine $CO_2$ absorption/regeneration unit 521 to produce a $CO_2$ stream 523 and an $H_2$-rich stream 524 (similar to stream 459 in FIG. 4). $CO_2$ stream 523 can be compressed, liquefied, conducted away, stored, sequestered, or utilized, reducing $CO_2$ emissions to the atmosphere.

Stream 524, comprising CO, $CO_2$, and $H_2$, can be combined with a steam cracker $H_2$ stream 525 produced from the recovery section of the olefins production plant as described below to form a joint fuel gas stream 527. A split stream 516 of stream 527 is supplied to and combusted in the SMR to generate the thermal energy heating the radiant section 311 and the convection section 309 as described above. Flue gas stream 518 exiting the SMR contains considerably reduced concentration of $CO_2$ compared to the SMR flue gas stream 357 in the process of FIG. 3. As such, $CO_2$ capture from stream 518 is not needed, in contrast to the process of FIG. 3.

As shown in FIG. 5, a split stream 531 of the $H_2$-rich fuel gas stream 527 is then supplied to steam cracker(s) 371 located in an olefins production plant as a steam cracker fuel, where it combusts to provide the thermal energy needed for the heating and cracking of a steam cracker feed and to generate a flue gas stream 533 exiting the steam cracker 371. Due to the limited amount of CO and $CH_4$ present in stream 527, the flue gas stream 533 comprises limited amount of $CO_2$, rendering $CO_2$ capture from it unnecessary. A steam cracker hydrocarbon feed stream 369 and a dilution steam stream 373 enter steam cracker 371, heated in a convection section thereof, and then enter into a radiant section where cracking occurs at high temperature for a short residence time to produce a steam cracker effluent comprising $H_2$, C1-C4 hydrocarbons comprising the desirable C2-C4 olefins, and C5+ hydrocarbons, among others. The steam cracker effluent is immediately cooled down via quenching and/or indirect heat exchange in steam cracker 371, producing a quenched steam cracker effluent stream 375 and a substantial quantity of HPS which is then superheated to produce an SH-HPS stream 376. The quenched steam cracker effluent stream 375 is sent to the hot-ends 378 of the recovery section where it is further cooled. In section 378 a dilution steam 373 is generated which is sent to steam cracker 371. A split stream 529 of $H_2$-rich stream 527 may be supplied to one or more boilers 363 to produce additional amount of SH-HPS in stream 365. Streams 343, 365 and 376 can be combined to form a joint stream 377. Separation of the cooled steam cracker effluent stream produces a process gas stream comprising $H_2$ and C1-C4 hydrocarbons including the desired C2-C4 olefins. The process gas stream is compressed in one or more compressors 380 to an elevated pressure, supplied to the cold end 379 of the recovery section to produce, among others, a steam cracker $H_2$ stream 525 described above, a $CH_4$-rich stream 525 consisting essentially of $CH_4$ and $H_2$; an ethylene product stream 391, a propylene product stream 392, and one or more C4+ co-product streams 393, among others.

The SH-HPS stream 377 is supplied to one or more steam turbine(s) driving one or more process gas and/or refrigeration compressors 380. An HPS stream 381 may be produced from one or more turbine(s). A split stream 502 of stream 381 can be fed into the SMR together with the natural gas feed stream 303 and the $CH_4$-rich stream 535 as described above. Another split stream of stream 381 may be fed to one or more other turbine(s), where it is expanded to produce additional shaft power, or may be used for process heating duty. An MPS stream 383 may be produced from one or more turbine(s), split into a stream 386 which is fed to one or more other turbine(s), o may be used for process heating duty, and a stream 385 which is fed to the hot end 378 of the recovery section to generate dilution steam. An LPS stream 382 may be produced from one or more turbine. As shown in FIG. 5, a split stream (or the entirety) of stream 382 can be supplied to the amine $CO_2$ absorption/regeneration unit 521, where it is used to heat the regenerator to effect the separation of $CO_2$ stream 523 from an amine The turbines may optionally exhaust one or more condensable streams 584, which is supplied to one or more surface condensers 587, where it is cooled by a cooling water stream 588 to produce a condensate stream 589.

In process 501 of FIG. 5, $CO_2$ emissions from steam cracker(s) 371 is reduced by combusting the $H_2$-rich stream 367 compared to conventional steam cracker(s) combusting natural gas, methane-rich tail-gas, or a combination of natural-gas and methane-rich tail-gas; $CO_2$ emissions from boiler(s) 363 is reduced because $H_2$-rich stream 529 is supplied thereto, compared to conventional boilers combusting natural gas or a combination of natural-gas and methane-rich-tail-gas; and $CO_2$ emission is reduced by capturing $CO_2$ stream 523 from the SMR flue gas stream 357 using the amine absorption/regeneration unit 355 compared to a conventional $H_2$ production plant using an SMR combusting natural gas without capturing $CO_2$ from the SMR flue gas. Compared to process/system 301 of FIG. 3, the integrated process/system 501 of FIG. 5 has at least the following advantages: (i) lower capital costs and operational costs due to the elimination of the PSA unit; (ii) because the amine $CO_2$ capture unit 521 in FIG. 5 operates at an above-atmospheric pressure (e.g., ≥200 kPa absolute, preferably ≥500 kPa absolute, preferably ≥800 kPa absolute) considerably higher than the amine unit 355 in the process of FIG. 3 (which operates at atmospheric pressure), unit 521 can be considerably smaller than unit 355, resulting in considerably less capital and operational costs; (iii) because the $CH_4$-rich stream 535 is fed into the SMR as a part of the hydrocarbon feed, it is converted into a portion of the $H_2$-rich stream 522 and a portion of the $CO_2$ stream 523 which can be captured, resulting in potentially considerably lower $CO_2$ emission to the atmosphere than the process of FIG. 3, where the tailgas stream 390, rich in $CH_4$, is typically combusted to produce a flue gas comprising $CO_2$ at atmospheric pressure difficult and expensive to capture; (iv) because the HPS stream 343 in FIG. 5 is supplied to the olefins production plant feeding the steam turbines including the major turbines therein, the power island including steam turbine 347 and generator 351 in FIG. 3 is eliminated, resulting in considerably lower capital and operational costs; (v) because LPS stream(s) produced from various turbines in the olefins production plant in FIG. 5 are supplied to the amine $CO_2$ capture unit 521, a reduced number of streams and/or reduced total quantity of condensable stream(s) 584 can be supplied to fewer and/or reduced-duty surface condenser(s) 587 compared to condensable stream(s) 384 and surface condenser(s) 387 in FIG. 3, or condensable streams 584 and surface condensers 587 may be completely eliminated, resulting in reduced amount of thermal energy released to the atmosphere, and in considerably lower capital and operational costs.

Figure 6:
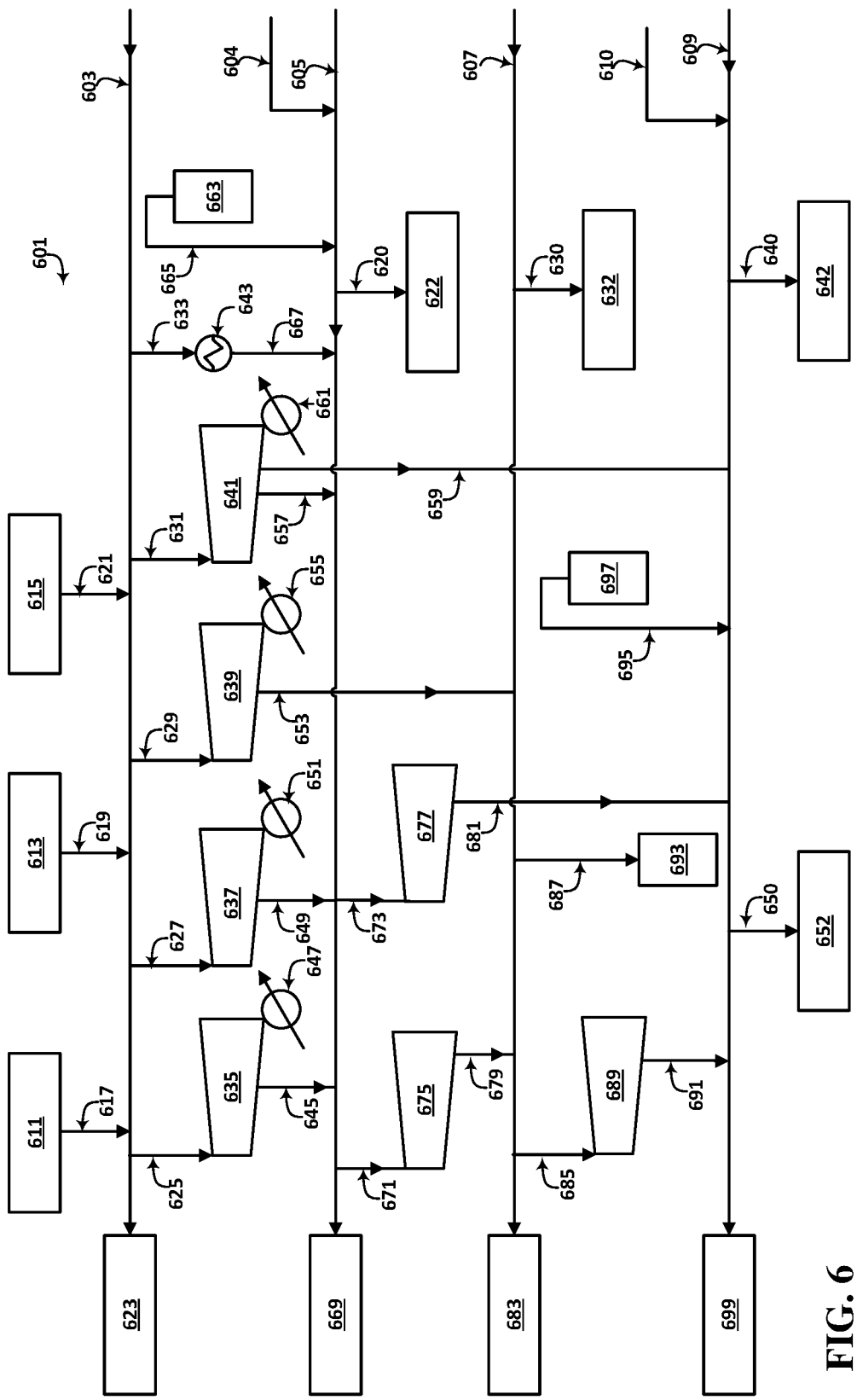
FIG. 6 schematically illustrates a steam supply/consumption configuration of a comparative olefins production plant including multiple steam crackers.

FIG. 6 (Comparative)

FIG. 6 schematically illustrates a steam supply/consumption configuration 601 of a comparative olefins production plant including multiple steam crackers. As shown, the plant supplies superheated steams through lines 603, 605, 607, and 609 at the following temperature and pressures, respectively: 930° F. and 1500 psig (Super-HPS); 700° F. and 660 psig (HPS); 570° F. and 225 psig (MPS); and 450° F. and 50 psig (LPS). 1560 kilo-pounds/hour ("klb/hr") of Super-HPS in stream 617 produced by a gas turbine generator unit 611, 540 klb/hr of Super-HPS in stream 619 produced by the multiple steam cracker furnaces 613, and 596 klb/hr of Super-HPS in stream 621 produced by boilers 615 are supplied to line 603. From line 603, the Super-HPS streams 625, 627, 629, 631, and 633 are supplied to steam turbines 635, 637, 639, 641, and heat exchanger 643 at the following flow rates, respectively: 879 klb/hr; 710 klb/hr; 745 klb/hr, 301 klb/hr, and 3 klb/hr. From line 603, 58 klb/hr of the Super-HPS is exported to other users 623. Steam streams entering steam turbines are expanded therein to produce one or more steam streams and shaft power. The shaft power can be used to drive various equipment in the olefins production plant, such as process gas compressor(s), propylene refrigeration compressor(s), and pumps, and the like.

Line 605 receives an imported HPS stream 604 at 30 klb/hr, an HPS stream 645 produced from steam turbine 635 at 700 klb/hr, an HPS stream 649 produced from steam turbine 637 at 585 klb/hr, an HPS stream 657 produced from steam turbine 641 at 100 klb/hr, an HPS stream 667 from heat exchanger 643 at 3 klb/hr, and an HPS stream 665 from a steam drum 663 at 10 klb/hr. All four steam turbines 635, 637, 639, and 641 also produce a condensable steam stream condensed at a surface condenser 647, 651, 655, and 661, respectively, at the following flow rates, respectively: 179 klb/hr, 124 klb/hr, 79 klb/hr, and 149 klb/hr. From line 605, HPS streams 671, 673, and 620 are supplied to steam turbines 675 and 677 and other on-site users 622 at the following flow rates, respectively: 540 klb/hr, 127 klb/hr, and 68 klb/hr. From line 605, 695 klb/hr of HPS is exported to other users 669.

Line 607 receives an MPS stream 679 produced from back-pressure steam turbines 675 at 540 klb/hr, and an MPS stream 653 produced from steam turbine 639 at 667 klb/hr. Steam turbines 675 does not produce a condensable stream supplied to a surface condenser.

From line 607, MPS streams 685, 687 and 630 are supplied to steam turbines 689, on-site users 693, and on-site users 632 at the following flow rates, respectively: 324 klb/hr, 206 klb/hr, and 306 klb/hr. From line 607, 330 klb/hr of MPS is exported to other users 683.

Line 609 receives an imported LPS stream 610 at a flow rate of 12 klb/hr, an LPS stream 691 produced from back-pressure steam turbines 689 at 324 klb/hr, an LPS stream 681 produced from steam back-pressure turbines 677 at 127 klb/hr, an LPS stream 695 produced from steam drum 697 at a flow rate of 70 klb/hr, and an LPS stream 659 from turbines 541 at 52 klb/hr. Neither of steam turbines 689 and 677 produces a condensable stream supplied to a surface condenser. From line 609, LPS streams 640 and 650 are supplied to on-site users 642 and 652, respectively, at the following flow rates, respectively: 261 klb/hr, and 207 klb/hr. No LPS is exported to external user 699.

FIG. 7 (Inventive)

Figure 7:
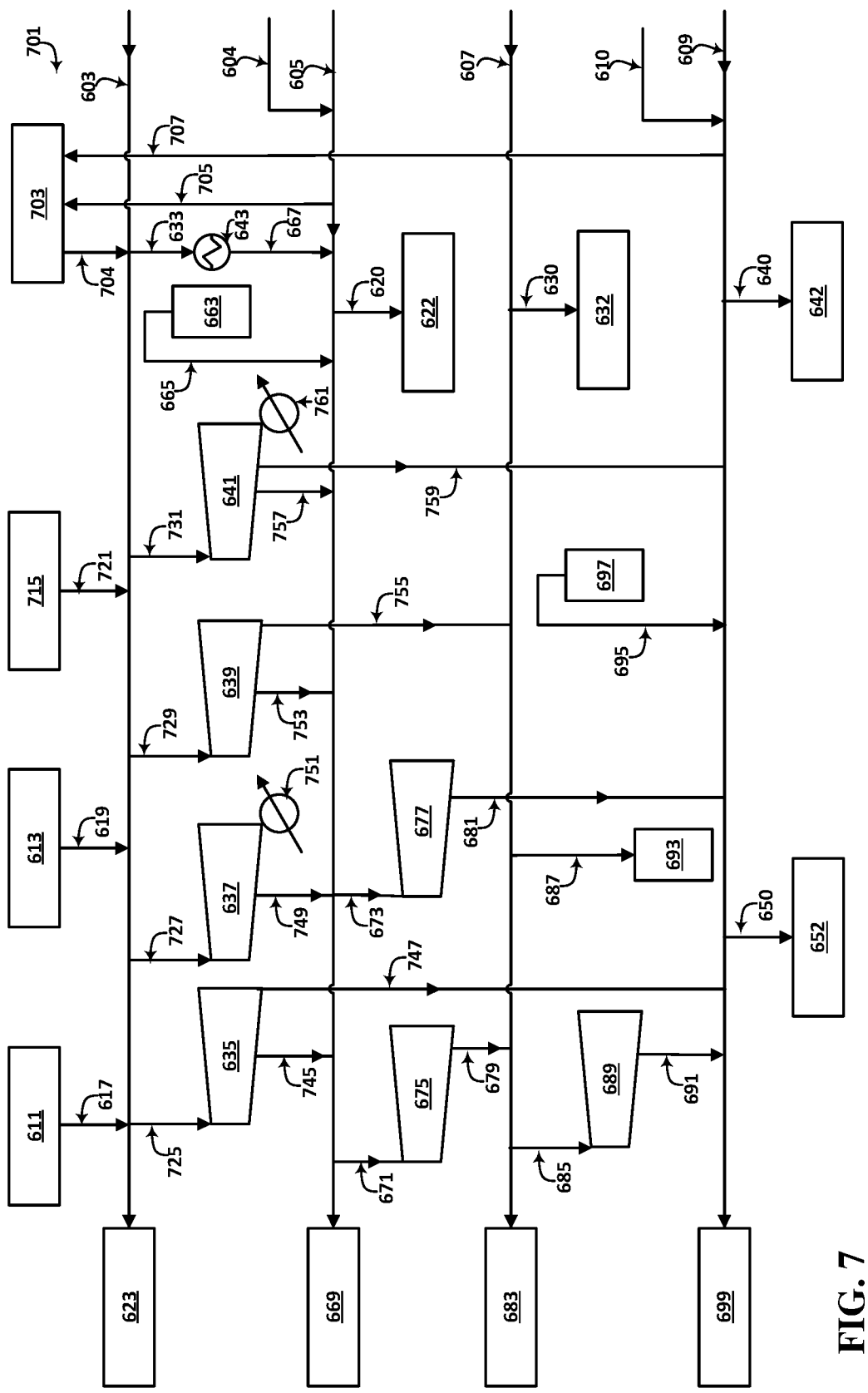
FIG. 7 schematically illustrates an inventive steam supply/consumption configuration of an olefins production plant modified from the plant of FIG. 6 and steam-integrated with an SMR.

FIG. 7 schematically illustrates an inventive steam supply/consumption configuration 701 of an olefins production plant modified from the plant of FIG. 6 and steam-integrated with an SMR. As shown in FIG. 7, the plant supplies superheated steams through lines 603, 605, 607, and 609 at the following temperature and pressures, respectively: 930° F. and 1500 psig (Super-HPS); 700° F. and 660 psig (HPS); 570° F. and 225 psig (MPS); and 450° F. and 50 psig (LPS), the same as in FIG. 6. 1560 klb/hr of Super-HPS in stream 617 produced by a gas turbine generator unit 611, 540 klb/hr of Super-HPS in stream 619 produced by the multiple steam cracker furnaces 613, 262 klb/hr of Super-HPS in stream 721 produced by boilers 715, and 905 klb/hr of Super-HPS in stream 704 produced by an SMR 703 are supplied to line 603. From line 603, the Super-HPS streams 725, 727, 729, 731, and 633 are supplied to steam turbines 635, 637, 639, 641, and heat exchanger 643 at the following rates, respectively: 951 klb/hr; 808 klb/hr, 1073 klb/hr, 373 klb/hr, and 3 klb/hr. From line 603, 58 klb/hr of the Super-HPS is exported to other users 623.

Line 605 receives an imported HPS stream 604 at 30 klb/hr, an HPS stream 745 produced from steam turbine 635 at 630 klb/hr, an HPS stream 749 produced from steam turbine 637 at 700 klb/hr, an HPS stream 753 produced from steam turbine 639 at 407 klb/hr, an HPS stream 757 produced from steam turbine 641 at 149 klb/hr, an HPS stream 667 from heat exchanger 643 at 3 klb/hr, and an HPS stream 665 from a steam drum 663 at 10 klb/hr. Only steam turbines 637 and 641 also produce a condensable steam stream condensed at a surface condenser 751 and 761, respectively, at the following flow rates, respectively: 108 klb/hr and 89 klb/hr. From line 605, HPS streams 671 and 673 are supplied to steam turbines 675 and 677 and other on-site users 622 at the following flow rates, respectively: 540 klb/hr, 127 klb/hr, and 68 klb/hr. From line 605, 695 klb/hr of HPS is exported to other users 669. Additionally, from line 605, an HPS stream 705 at a flow rate of 499 klb/hr is supplied to SMR 703 as steam feed to the SMR.

Line 607 receives an MPS stream 679 produced from steam turbine 675 at 540 klb/hr, and an MPS stream 755 produced from steam turbine 639 at 666 klb/hr. Steam turbine 675 does not produce a condensable stream supplied to a surface condenser. From line 607, MPS streams 685, 687 and 630 are supplied to steam turbine 689, on-site users 693, and on-site users 632 at the following flow rates, respectively: 324 klb/hr, 206 klb/hr, and 306 klb/hr. From line 607, 360 klb/hr of MPS is exported to other users 683.

Line 609 receives an imported LPS stream 610 at a flow rate of 12 klb/hr, an LPS stream 691 produced from steam turbine 689 at 324 klb/hr, an LPS stream 681 produced from steam turbine 677 at 127 klb/hr, an LPS stream 695 produced from steam drum 697 at a flow rate of 70 klb/hr, and an LPS stream 759 produced from steam turbine 641 at 136 klb/hr. Neither of steam turbines 689 and 677 produces a condensable stream supplied to a surface condenser. From line 609, LPS streams 640 and 650 are supplied to on-site users 642 and 652, respectively, at the following flow rates, respectively: 261 klb/hr, and 207 klb/hr. Additionally, from line 609, an LPS stream 707 at a flow rate of 487 klb/hr is supplied to the amine regenerator of an amine $CO_2$ capture unit associated with SMR 703.

This disclosure is further illustrated by the following non-limiting Examples.

EXAMPLES

The olefins production plants illustrated in FIGS. 6 and 7 are used in these examples. Example 1, a comparative example, corresponds to FIG. 6. Example 2 corresponds to a combination of the olefins production plant of FIG. 6 and a $H_2$-rich fuel gas production plant of FIG. 4 wherein the $H_2$-rich stream 461 is supplied to the steam crackers 613 as steam cracker fuel; and a tailgas stream (similar to stream 390 in FIG. 3) produced in the olefins production plant is fed to the pre-reformer 411 in FIG. 4 as a hydrocarbon feed to the SMR. Example 3 corresponds to an $H_2$-rich fuel gas production plant steam-integrated with the olefins production plant as shown in FIGS. 5 and 7. The process conditions in the olefins plant, and hence the olefins plant compressor power requirements are assumed to remain constant in all three examples. In all three examples, the olefins production plant has the same steam crackers 613 with a 2,240 MBtu/hr total firing rate; and (ii) the same gas turbine generator unit 611 generating 1560 klb/hr of Super-HPS in stream 617, while supplying electricity to the olefins production plant and beyond. In all these examples, steam turbine 635 drives a low-pressure process gas compressor, steam turbine 637 drives a high-pressure process gas compressor, and steam turbines 639 and 641 drive propylene refrigeration compressors. Import steam streams 604 and 610, streams 665, 633, 667, 620, 630, 640, 650, 671, 673, 685, 691, 687, 695, and export streams supplied to users 623, 669, 683, and 699 remain constant in all three examples.

Example 1 (Comparative)

Example 1 corresponds to FIG. 6. It is assumed the fuel gases supplied to the steam crackers 613 and boilers 615 both comprise, on average, 35 mol % of $H_2$ and 65 mol % of $CH_4$, based on the total moles of molecules in the fuel gases. The boilers 615 have a 1,990 MBtu/hr total firing rate. Thus, the estimated $CO_2$ emissions from the steam cracker furnaces and the boilers are 1,780 kilotons per year ("kta"). From the four major steam-turbines 635, 637, 639, and 641, a total of 530 klb/hr of steam is condensed, giving a total condenser duty of 520 MBtu/hr (152 MW).

Example 2

Example 2 corresponds to a combination of the olefins production plant of FIG. 6 and an $H_2$-rich fuel gas production plant of FIG. 4 wherein the $H_2$-rich stream 461 is supplied to the steam crackers 613 as steam cracker fuel; and a tailgas stream (similar to stream 390 in FIG. 3) produced in the olefins production plant is fed to the pre-reformer 411 in FIG. 4 as a hydrocarbon feed to the SMR. No steam integration between the $H_2$-rich fuel gas production plant and the olefins production plant is contemplated in this Example 2. The reformer waste-heat recovery system generates HPS stream 469, some of which (split stream 479) is consumed in the SMR. The remainder (split stream 477) passes through a steam-turbine-generator (STG) generating 21 MW of electrical power. The STG is a back-pressure LPS turbine, and the exhaust LPS stream 485 is used to regenerate the amine used in the amine $CO_2$ unit 455. Fuel-grade $H_2$-rich stream 461 is combusted in the steam crackers 613 and boilers 615 in the olefins production plant. Stream 459, 461, and 417 are assumed to comprise 85 mol % $H_2$ and 15 mol % $CH_4$. Stream 461 exported to the olefins plant has a contained $H_2$ content of 185 million standard cubic feet per day ("MMSC/D").

In this Example 2, the total $CO_2$ emissions from the steam crackers 613, the boilers 615, and the SMR are 969 kta, a reduction of 811 kta from Example 1. If the electricity generated in the STG (generator 475 in FIG. 4) is credited at a $CO_2$ intensity of 0.389 ton per MWh, the net $CO_2$ emissions from the steam crackers 613, boilers 615, and the $H_2$-rich fuel gas plant 900 kta, which is a reduction of 880 kta (49%), from Example 1. Total fuel fired in the steam crackers 613, boilers 615 and the SMR increases from 4,230 MBtu/hr to 5,930 MBtu/hr, an increase of 40%.

Total $CO_2$ in $CO_2$ stream 457, which can be sequestered, is 1,410 kta, giving a ratio of $CO_2$ sequestered/$CO_2$ avoided of 1.60.

Example 3

Example 3 corresponds to an $H_2$-rich fuel gas production plant steam-integrated with the olefins production plant as shown in FIG. 7. Example 3 also corresponds to FIG. 5. A substantially the same $H_2$-rich fuel gas plant used in Example 2 above is used in this Example 3, providing 185 MMSCF/D contained $H_2$ in $H_2$-rich stream 461 in FIG. 4 (or stream 524 in FIG. 5), which is supplied to the SMR and the olefins production plant for combustion in the steam crackers 613 (or 371 in FIG. 5) and boilers 615 (or 363 in FIG. 5). A $CH_4$-rich stream 535 produced from the olefins production plant is supplied to the SMR as a portion of the hydrocarbon feed. The reformer waste-heat recovery unit ("WHRU") generates Super-HP steam stream 704 (or stream 343 in FIG. 5) at 905 klb/hr, which is entirely exported to the olefins plant Super-HPS line 603. The HPS steam 705 required by the SMR is supplied from the olefin plant HP steam header in line 605.

Compared to Example 1, two major steam turbines are changed to provide the desired steam system integration. Turbine 635, the low-pressure process gas compressor turbine, is changed from an HPS-extraction-and-condensing turbine to an HPS-extraction-and-LPS-back-pressure turbine. This reduces condensing energy loss to atmosphere and provides LPS stream 747 for the amine regenerator in the $CO_2$ capture unit 455. Turbine 639, the propylene refrigeration compressor turbine, is changed from an MPS-extraction-and-condensing turbine to an HPS-extraction-and-MPS-back-pressure turbine. This reduces condensing energy loss to the atmosphere and provides HPS stream 705 for the SMR 703. Turbine 637, the high-pressure process gas compressor turbine and turbine 641, the propylene concentrator heat-pump turbine, remain HPS-extraction-and-condensing turbines, but with increased rates of HPS stream 749 and 757, and reduced rates of condensable steam condensed at surface condensers 751 and 761. This also reduces condensing energy loss to the atmosphere and provides HPS steam 705 for SMR 703.

Compared to Examples 1 and 2, in Example 3, the required firing rates for boilers 715 are reduced from 1,990 MBtu/hr to 1,250 MBtu/hr, a reduction of 740 MBtu/hr (37%). Since the same volume of $H_2$-rich fuel-gas is imported from the SMR, the hydrogen content in the fuel-gas fired in the cracking furnaces and boilers increases from 85 mol % in Example 2 to 91 mol % in this Example 3 due to less make-up natural-gas being required.

In this Example 3, the total $CO_2$ emissions from the steam crackers 613, the boilers 615, and the SMR stacks is 610 kta, a reduction of 1170 kta (66%) from Example 1, and a reduction of 290 kta (32%) from Example 2. Since there is no STG in the reformer/hydrogen plant, there is no electricity credit versus Example 1. Compared to Example 2, the ratio of $CO_2$ sequestered/$CO_2$ avoided in this Example 3 is reduced from 1.60 to 1.21 due to the increased energy efficiency of the integrated system. Moreover, in this Example 3, condenser energy losses to atmosphere are reduced from 520 MBtu/hr to 190 MBtu/hr, a saving of 330 MBtu/hr (63%) compared to Examples 1 and 2. Key performance parameters are further provided/compared in TABLE II, below:

Listing of Embodiments

This disclosure can additionally include one or more of the following non-limiting embodiments:

A1. A process comprising:
(I) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(II) cooling the reformed stream by using a waste heat recovery unit ("WHRU") to produce a cooled reformed stream and to generate a high-pressure steam ("HPS") stream;
(III) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream;
(IV) cooling the first shifted stream to obtain a cooled first shifted stream;
(V) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;
(VI) abating steam present in the second shifted stream to produce a crude gas mixture stream comprising $CO_2$ and $H_2$;
(VII) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream; and
(VIII) supplying a portion of the $H_2$-rich stream to an olefins production plant comprising a steam cracker as at least a portion of a steam cracker fuel gas, and

TABLE II

|  |  | Example | | | Change between Example | | |
|---|---|---|---|---|---|---|---|
|  |  | 1 | 2 | 3 | 2-1 | 3-1 | 3-2 |
| Cracking Furnace Firing | MBtu/hr | 2,240 | 2,240 | 2,240 | 0 | 0 | 0 |
| Boiler Firing | MBtu/hr | 1,990 | 1,990 | 1,250 | 0 | −740 | −740 |
| Reformer Firing | MBtu/hr | 0 | 1,700 | 1,700 | 1,700 | 1,700 | 0 |
| Total Firing | MBtu/hr | 4,230 | 5,930 | 5,190 | 1,700 | −740 | −740 |
| $H_2$ content of Fuel-gas | mol % | 35 | 85 | 91 | 50 | 56 | 6 |
| Stack $CO_2$ (8400 hrs/yr) | kta | 1,780 | 969 | 610 | −811 | −1170 | −359 |
| STG electricity | MW | — | 21 | — | 21 | — | −21 |
| STG $CO_2$ Equiv (0.389 t/MWh) | kta | — | 69 | — | 69 | — | −69 |
| Net $CO_2$ Emissions (8400 hrs/yr) | kta | 1,780 | 900 | 610 | −880 | −1170 | −290 |
| $CO_2$ Avoided (vs. Example 1) | kta | — | 880 | 1,170 | — | — | — |
|  | % | — | 49 | 66 | — | — | — |
| $CO_2$ Avoided (vs. Example 2) | kta | −880 | 0 | 290 | — | — | — |
|  | % | — | 0 | 16 | — | — | — |
| Turbine Condenser Duty | MBtu/hr | 520 | 520 | 190 | 0 | −330 | −330 |
| $CO_2$ Sequestered | kta | — | 1,410 | 1,410 | 1,410 | 1,410 | 0 |
| $CO_2$ sequestered/avoided (v. Example 1) |  | — | 1.60 | 1.21 | — | — | — | combusting the steam cracker fuel gas to provide thermal energy to the steam cracker.

A2. The process of A1, wherein the $H_2$-rich stream further comprises $H_2$ at a concentration of at least 85 mol % and at least one and preferably all of: ≤5 mol % of $CH_4$; ≤3 mol % CO; and ≤1 mol % $CO_2$, based on the total moles of molecules in the $H_2$-rich stream.

A3. The process of A1 or A2, further comprising:
(IX) producing a $CH_4$-rich stream from the steam cracker effluent; and
(X) providing at a portion of the $CH_4$-rich stream as at least a portion of the hydrocarbon feed.

A4. The process of A3, wherein the $CH_4$-rich stream comprises at least one of: ≤40 mol % $H_2$; ≤10 mol % ethane; and ≤5 mol % CO, based on the total moles of molecules in the $CH_4$-rich stream.

A5. The process of A3 or A4, wherein the $CH_4$-rich stream has an absolute pressure higher than that of the hydrocarbon feed supplied into the syngas producing unit in step (I), and step (XI comprises:
(Xa) expanding the $CH_4$-rich stream through a turbo-expander and/or a Joule-Thompson valve to produce a cooled $CH_4$-rich stream having a pressure in the vicinity of the pressure of the hydrocarbon feed;
(Xb) heating the cooled $CH_4$-rich stream by using a stream in the olefins production plant via a heat exchanger to produce a heated $CH_4$-rich stream; and
(Xc) providing at least a portion of the heated $CH_4$-rich stream as at least a portion of the hydrocarbon feed.

A6. The process of any of A1 to A5, further comprising:
(XI) producing a steam cracker $H_2$ stream from the olefins production plant; and
(XII) supplying at least one of the following to the syngas producing unit as at least a portion of the reforming fuel gas: (a) at least a portion of the $H_2$-rich stream; (b) at least a portion of the steam cracker $H_2$ stream; and (c) a joint stream of (a) and (b).

A7. The process of any of A1 to A6, further comprising:
(XIII) supplying at least one of the following to the steam cracker as at least a portion of the steam cracker fuel gas: (a) a least a portion of the steam cracker $H_2$ stream; (b) at least a portion of the steam cracker $H_2$ stream; and (c) a joint stream of (a) and (b).

A8. The process of any of A1 to A7, further comprising:
(XIV) supplying at least one of the following to boiler(s) located in the olefins production plant as a boiler fuel gas: (a) a least a portion of the steam cracker $H_2$ stream; (b) at least a portion of the steam cracker $H_2$ stream; and (c) a joint stream of (a) and (b); and combusting the boiler fuel gas to supply thermal energy to the boiler(s).

A9. The process of A8, wherein the boiler(s), taken together, produce no more than 10% of the total amount of HPS streams consumed by the olefins production plant.

A10. The process of any of A1 to A7, wherein the olefins production plant does not include a boiler producing steam consumed by the olefins production plant.

A11. The process of any of A6 to A10, wherein the $H_2$-rich stream and the steam cracker $H_2$ stream, taken together, provide at least 60% of total fuel gas required, on a Btu basis, by the olefins production plant.

A12. The process of claim A11, wherein the $H_2$-rich stream provides at least 60% of total fuel gas required, on a Btu basis, by the operation of the olefins production plant.

A13. The process of any of A1 to A12, wherein the HPS stream generated in step (II) has an absolute pressure from 4,000 kPa to 14,000 kPa, and the process further comprises:

(XV) heating the HPS stream to produce a superheated HPS ("SH-HPS") stream having a temperature from 350° C. to 550° C.; and
(XVI) supplying at least a portion of the SH-HPS stream to at least one first steam turbine(s) in the olefins production plant, and expanding the SH-HPS stream in the at least one first steam turbine(s) to produce shaft power and a first expanded steam stream.

A14. The process of A13, wherein in step (XVI), the portion of the SH-HPS stream is combined with an SH-HPS produced from the steam cracker to form a joint SH-HPS stream, and at least a portion of the joint SH-HPS stream is then supplied to the first turbine.

A15. The process of A13 or A14, wherein the at least one first steam turbine(s) drives at least one of the following in the olefins production plant: a process gas compressor; a propylene refrigeration compressor; an ethylene refrigeration compressor; and combinations thereof.

A16. The process of any of A13, A14, and A15, wherein the first expanded stream has a pressure in the vicinity of that of the steam feed to the syngas producing unit, and the process further comprises:
supplying at least a portion of the first expanded steam stream to the syngas producing unit as at least a portion of the steam feed.

A17. The process of any of A13 to A16, further comprising:
(XVII) expanding at least a portion of the first expanded steam stream in a second steam turbine in the olefins production plant to produce additional shaft power and a second expanded steam stream.

A18. The process of any of A13 to A17, further comprising:
(XVIII) expanding at least a portion of the second expanded steam stream in a third steam turbine in the olefins production plant to produce additional shaft power and a third expanded steam stream.

A19. The process of any of A13 to A18, wherein the SH-HPS stream obtained in step (XVI) is a Super-HPS stream, and the first expanded stream is an HPS stream, an MPS stream, or an LPS stream.

A20. The process of any of A17 to A19, wherein the second expanded steam is an MPS stream, or an LPS stream.

A21. The process of any of A17 to A20, wherein the third expanded stream is an LPS stream.

A22. The process of any of A13 to A21, wherein at least one of the first steam turbine, the second steam turbine, and the third steam turbine does not produce a condensable stream supplied to a surface condenser.

A23. The process of any of A13 to A22, wherein step (VII) is carried out using an amine $CO_2$ capture unit comprising an amine regenerator, and the process further comprises:
(XIX) extracting a process heating steam stream from at least one of the first steam turbine, the second steam turbine, and the third steam turbine, and the process heating steam stream has an absolute pressure from 200 kPa to 1,050 kPa; and
(XX) supplying the process heating steam stream to the amine regenerator to effect the separation of the $CO_2$ stream from the $H_2$-rich stream.

A24. The process of any of A1 to A23, wherein the olefins production plant comprises a combined-cycle power plant, the combined-cycle power plant comprises one or more duct burners combusting a duct burner fuel to generate thermal energy, and the process further comprises combusting a portion of the H$_2$-rich stream and/or a portion of the steam-cracker H$_2$ stream as at least a portion of the duct burner fuel.

A25. The process of any of A1 to A24, wherein any portion of the HPS stream and any steam generated in the olefins production plant is not supplied to a steam turbine driving an electricity generator.

A26. The process of any of A27 to A25, wherein the H$_2$-rich stream and the steam-cracker H$_2$ stream together provides at least 60%, on a BTU basis, of the total combustion fuel needed by the operation of the olefins production plant.

A27. The process of any of A1 to A26, wherein a single water demineralization plant provides all the water needed for steam generating in the H$_2$-rich gas production plant and the olefins production plant.

A28. The process of any of A1 to A27, wherein the reformed stream has at least one of the following: a temperature of from 750° C. to 1,200° C., and an absolute pressure from 700 kPa to 5000 kPa.

A29. The process of any of A1 to A28, wherein the cooled reformed stream produced in step (II) has a temperature from 285° C. to 400° C.

A30. The process of any of A1 to A29, wherein in step (III), the first shifted stream has at least one of the following: a temperature from 335° C. to 500° C.; and an absolute pressure from 700 kPa to 5,000 kPa.

A31. The process of any of A1 to A30, wherein step (IV) comprises cooling the first shifted stream, via a heat exchanger, by a cooling stream selected from: a stream comprising the hydrocarbon feed; a boiler feed water stream; and combinations thereof.

A32. The process of any of A1 to A31, wherein the cooled first shifted stream has at least one of the following: a temperature from 150° C. to 250° C., and an absolute pressure from 700 kPa to 5,000 kPa.

A33. The process of any of A1 to A32, wherein in step (V), the second shifted stream has at least one of the following: a temperature from 150° C. to 300° C.; an absolute pressure from 700 kPa to 5000 kPa; and a CO concentration no greater than 5.0 mol %, based on the total moles of molecules in the second shifted stream.

A34. The process of any of A1 to A33, wherein step (VI) comprises:
(VIa) cooling the second shifted stream to condense a portion of steam in the second shifted stream to form liquid water and to obtain a cooled second shifted stream; and
(VIb) separate the liquid water from the cooled second shifted stream to obtain the crude gas mixture stream.

A35. The process of any of the preceding claims, wherein step (VII) comprises at least one of the following:
(VII.1) separating at least a portion of the gas mixture by using an amine absorption and regeneration process;
(VII.2) separating at least a portion of the gas mixture by using a cryogenic CO$_2$ separation process;
(VII.3) separating at least a portion of the gas mixture by using a membrane separation process; and
(VII.4) separating at least a portion of the gas mixture by using a physical absorption and regeneration process.

A36. The process of any of A1 to A35, wherein step (VII) comprises the following:
(VIIa) obtaining an exhaust steam stream having an absolute pressure from 200 kPa to 1,050 kPa and shaft power from one or more extraction turbine(s)extraction turbine(s) and/or back-pressure turbine(s) (preferably one or more back-pressure turbine(s)) located in a an olefins production plant;
(VIIb) feeding the crude gas mixture stream and a lean-amine stream comprising an amine into an absorption column;
(VIIc) obtaining a CO$_2$-rich amine stream and a CO$_2$-depleted residual gas stream from the absorption column;
(VIId) feeding at least a portion of the CO$_2$-rich amine stream into a separation column;
(VIIe) heating the at least a portion of the CO$_2$-rich amine stream in the separation column using an exhaust steam stream to produce an overhead stream rich in CO$_2$ and a bottoms stream rich in the amine; and
(VIIf) recycling at least a portion of the bottoms stream to the absorption column as at least a portion of the lean-amine stream.

A37. The process of any of A1 to A36, wherein the syngas producing unit comprises a steam-methane-reformer ("SMR") and/or an autothermal reformer ("ATR").

A38. The process of A37, wherein:
the syngas producing unit comprises a SMR;
the SMR comprises: one or more SMR burners where an SMR fuel combusts to supply thermal energy to the SMR; a radiant section heated by the thermal energy in which the hydrocarbon feed and steam react under the syngas producing conditions; a convection section heated by the thermal energy in which the hydrocarbon feed and steam are preheated before entering the radiant section; and
in step (VII), a portion of the H$_2$-rich stream and/or a portion of the steam cracker H$_2$ stream is supplied to the plurality of SMR burners as at least a portion of the reforming fuel gas.

A39. The process of A38, wherein step (XV) is carried out, and in step (XV), the HPS stream is heated in the convection section of the SMR and/or an auxiliary furnace to obtain the SH-HPS stream.

A40. The process of A37, wherein:
the syngas producing unit comprises an ATR;
an O$_2$ stream is fed into the ATR;
the ATR comprises a reaction vessel into which the hydrocarbon feed, the steam feed, and the O$_2$ stream are supplied;
the syngas producing conditions comprises the presence of an ATR catalyst in the reaction vessel; and
the reformed stream has at least one of the following: a temperature from 800° C. to 1200° C.; and an absolute pressure from 700 kPa to 5,000 kPa.

A41. The process of A40, wherein step (XV) is carried out, and in step (XV), the HPS stream is heated in an auxiliary furnace to obtain the SH-HPS stream.

A42. A process comprising:
(1) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises H$_2$, CO, and steam;
(2) cooling the reformed stream by using a waste heat recovery unit ("WHRU") to produce a cooled reformed stream and to generate a high-pressure steam ("HPS") stream;
(3) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream;

(4) cooling the first shifted stream to obtain a cooled first shifted stream;

(5) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;

(6) abating steam present in the second shifted stream to produce a crude gas mixture stream comprising $CO_2$ and $H_2$;

(7) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream;

(8) combusting a portion of the $H_2$-rich stream in a steam cracker located in an olefins production plant to generate thermal energy and to produce a flue gas stream comprising $CO_2$ at a concentration no greater than 20 mol % based on the total moles of $H_2O$ and $CO_2$ in the flue gas stream, wherein the steam cracker is operated under steam cracking conditions to convert a steam cracker feed into a steam cracker effluent comprising olefins;

(9) producing a $CH_4$-rich stream from the steam cracker effluent; and

(10) providing the $CH_4$-rich stream as at least a portion of the hydrocarbon feed.

A43. The process of A42, wherein:
the syngas producing unit comprises a SMR;
the SMR comprises: one or more SMR burners where a SMR fuel combusts to supply thermal energy to the SMR; a radiant section heated by the thermal energy in which the hydrocarbon feed and steam reacts under the syngas producing conditions; a convection section heated by the thermal energy in which the hydrocarbon feed and steam are preheated before entering the radiant section; and the process further comprises:

(11) combusting a portion of the $H_2$-rich stream at the plurality of SMR burners as at least a portion of the SMR fuel.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process comprising:
(I) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;

(II) cooling the reformed stream by using a waste heat recovery unit ("WHRU") to produce a cooled reformed stream and to generate a high-pressure steam ("HPS") stream;

(III) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream;

(IV) cooling the first shifted stream to obtain a cooled first shifted stream;

(V) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;

(VI) abating steam present in the second shifted stream to produce a crude gas mixture stream comprising $CO_2$ and $H_2$;

(VII) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream; and (VIII) supplying a portion of the $H_2$-rich stream to an olefins production plant comprising a steam cracker as at least a portion of a steam cracker fuel gas, and combusting the steam cracker fuel gas to provide thermal energy to the steam cracker.

2. The process of claim 1, wherein the $H_2$-rich stream further comprises $H_2$ at a concentration of at least 85 mol % and at least one of: ≤5 mol % of $CH_4$; ≤3 mol % CO; and ≤1 mol % $CO_2$, based on the total moles of molecules in the $H_2$-rich stream.

3. The process of claim 1, further comprising:
(IX) producing a $CH_4$-rich stream from the steam cracker effluent; and
(X) providing at a portion of the $CH_4$-rich stream as at least a portion of the hydrocarbon feed.

4. The process of claim 3, wherein the $CH_4$-rich stream comprises at least one of: ≤40 mol % $H_2$; ≤10 mol % ethane; and ≤5 mol % CO, based on the total moles of molecules in the $CH_4$-rich stream.

5. The process of claim 3, wherein the $CH_4$-rich stream has an absolute pressure higher than that of the hydrocarbon feed supplied into the syngas producing unit in step (I), and step (XI) comprises:
(Xa) expanding the $CH_4$-rich stream through a turbo-expander and/or a Joule-Thompson valve to produce a cooled $CH_4$-rich stream having a pressure in the vicinity of the pressure of the hydrocarbon feed;
(Xb) heating the cooled $CH_4$-rich stream by using a stream in the olefins production plant via a heat exchanger to produce a heated $CH_4$-rich stream; and
(Xc) providing at least a portion of the heated $CH_4$-rich stream as at least a portion of the hydrocarbon feed.

6. The process of claim 1, further comprising:
(XI) producing a steam cracker $H_2$ stream from the olefins production plant; and (XII) supplying at least one of the following to the syngas producing unit as at least a portion of the reforming fuel gas: (a) at least a portion of the $H_2$-rich stream; (b) at least a portion of the steam cracker $H_2$ stream; and (c) a joint stream of (a) and (b).

7. The process of claim 1, further comprising:
(XIII) supplying at least one of the following to the steam cracker as at least a portion of the steam cracker fuel gas: (a) a least a portion of the steam cracker $H_2$ stream; (b) at least a portion of the steam cracker $H_2$ stream; and (c) a joint stream of (a) and (b).

8. The process of claim 1, further comprising:
(XIV) supplying at least one of the following to boiler(s) located in the olefins production plant as a boiler fuel gas: (a) a least a portion of the steam cracker $H_2$ stream; (b) at least a portion of the steam cracker $H_2$ stream; and (c) a joint stream of (a) and (b); and combusting the boiler fuel gas to supply thermal energy to the boiler(s).

9. The process of claim 6, wherein the $H_2$-rich stream and the steam cracker $H_2$ stream, taken together, provide at least 60% of total fuel gas required, on a Btu basis, by the olefins production plant.

10. The process of claim 9, wherein the $H_2$-rich stream and the steam cracker $H_2$ stream, taken together, provide at least 80% of total fuel gas required, on a Btu basis, by the olefins production plant.

11. The process of claim 9, wherein the $H_2$-rich stream provides at least 60% of total fuel gas required, on a Btu basis, by the operation of the olefins production plant.

12. The process of claim 1, wherein the HPS stream generated in step (II) has an absolute pressure from 4,000 kPa to 14,000 kPa, and the process further comprises:
(XV) heating the HPS stream to produce a superheated HPS ("SH-HPS") stream having a temperature from 350° C. to 550° C.; and
(XVI) supplying at least a portion of the SH-HPS stream to at least one first steam turbine(s) in the olefins production plant, and expanding the SH-HPS stream in the at least one first steam turbine(s) to produce shaft power and a first expanded steam stream.

13. The process of claim 12, wherein in step (XVI), the portion of the SH-HPS stream is combined with an SH-HPS stream produced from the steam cracker to form a joint SH-HPS stream, and at least a portion of the joint SH-HPS stream is then supplied to the first turbine.

14. The process of claim 12, wherein the at least one first steam turbine(s) drives at least one of the following in the olefins production plant: a process gas compressor; a propylene refrigeration compressor; an ethylene refrigeration compressor; and combinations thereof.

15. The process of claim 12, wherein the first expanded stream has a pressure in the vicinity of that of the steam feed to the syngas producing unit, and the process further comprises:
supplying at least a portion of the first expanded steam stream to the syngas producing unit as at least a portion of the steam feed.

16. The process of claim 12, further comprising:
(XVII) expanding at least a portion of the first expanded steam stream in a second steam turbine in the olefins production plant to produce additional shaft power and a second expanded steam stream.

17. The process of claim 12, wherein the SH-HPS stream obtained in step (XVI) is a Super-HPS stream, and the first expanded stream is an HPS stream, an MPS stream, or an LPS stream.

18. The process of claim 16, wherein the second expanded steam is an MPS stream, or an LPS stream.

19. The process of claim 12, wherein at least one of the first steam turbine and the second steam turbine does not produce a condensable stream supplied to a surface condenser.

20. The process of claim 12, wherein step (VII) is carried out using an amine $CO_2$ capture unit comprising an amine regenerator, and the process further comprises:
(XIX) extracting a process heating steam stream from at least one of the first steam turbine, the second steam turbine, and the third steam turbine, and the process heating steam stream has an absolute pressure from 200 kPa to 1,050 kPa; and
(XX) supplying the process heating steam stream to the amine regenerator to effect the separation of the $CO_2$ stream from the $H_2$-rich stream.

21. The process of claim 1, wherein the olefins production plant comprises a combined-cycle power plant, the combined-cycle power plant comprises one or more duct burners combusting a duct burner fuel to generate thermal energy, and the process further comprises combusting a portion of the $H_2$-rich stream and/or a portion of the steam-cracker $H_2$ stream as at least a portion of the duct burner fuel.

22. The process of claim 17, wherein the $H_2$-rich stream and the steam-cracker $H_2$ stream together provides at least 60%, on a BTU basis, of the total combustion fuel needed by the operation of the olefins production plant.

23. The process of claim 1, wherein a single water demineralization plant provides all the water needed for steam generating in the $H_2$-rich gas production plant and the olefins production plant.

24. A process comprising:
(1) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(2) cooling the reformed stream by using a waste heat recovery unit ("WHRU") to produce a cooled reformed stream and to generate a high-pressure steam ("HPS") stream;
(3) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream;
(4) cooling the first shifted stream to obtain a cooled first shifted stream;
(5) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;
(6) abating steam present in the second shifted stream to produce a crude gas mixture stream comprising $CO_2$ and $H_2$;
(7) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream;

(8) combusting a portion of the $H_2$-rich stream in a steam cracker located in an olefins production plant to generate thermal energy and to produce a flue gas stream comprising $CO_2$ at a concentration no greater than 20 mol % based on the total moles of $H_2O$ and $CO_2$ in the flue gas stream, wherein the steam cracker is operated under steam cracking conditions to convert a steam cracker feed into a steam cracker effluent comprising olefins;

(9) producing a $CH_4$-rich stream from the steam cracker effluent; and

(10) providing the $CH_4$-rich stream as at least a portion of the hydrocarbon feed.

25. The process of claim 24, wherein:

the syngas producing unit comprises a SMR;

the SMR comprises: one or more SMR burners where a SMR fuel combusts to supply thermal energy to the SMR; a radiant section heated by the thermal energy in which the hydrocarbon feed and steam reacts under the syngas producing conditions; a convection section heated by the thermal energy in which the hydrocarbon feed and steam are preheated before entering the radiant section; and the process further comprises:

(11) combusting a portion of the $H_2$-rich stream at the plurality of SMR burners as at least a portion of the SMR fuel.

* * * * *